(12) United States Patent
Yuasa et al.

(10) Patent No.: US 7,851,576 B2
(45) Date of Patent: Dec. 14, 2010

(54) POLYMER AND CEMENT ADMIXTURE USING THE SAME

(75) Inventors: Tsutomu Yuasa, Osaka (JP); Noboru Sakamoto, Takatsuki (JP); Yuko Matsuda, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 1020 days.

(21) Appl. No.: 11/527,457

(22) Filed: Sep. 27, 2006

(65) Prior Publication Data

US 2007/0073022 A1    Mar. 29, 2007

(30) Foreign Application Priority Data

Sep. 27, 2005   (JP) ............................... 2005-280538

(51) Int. Cl.
  *C08F 20/06* (2006.01)
  *C08F 20/02* (2006.01)
  *C08J 3/00* (2006.01)
(52) U.S. Cl. .................. 526/317.1; 524/556; 525/329.7
(58) Field of Classification Search .............. 526/317.1; 524/556; 525/329.7
See application file for complete search history.

(56) References Cited

U.S. PATENT DOCUMENTS

| 5,478,521 | A | 12/1995 | Scheiner |
| 6,165,262 | A | 12/2000 | Kono et al. |
| 7,105,477 | B2 * | 9/2006 | Takiguchi et al. ........... 510/418 |
| 7,425,596 | B2 * | 9/2008 | Kraus et al. .............. 525/329.7 |
| 2003/0042209 | A1 | 3/2003 | Mori et al. |

FOREIGN PATENT DOCUMENTS

| EP | 0 859 028 | | 8/1998 |
| EP | 1 256 621 | | 11/2002 |
| EP | 1256621 | A1 * | 11/2002 |
| JP | 2001-220417 | | 8/2001 |
| JP | 2002-128889 | | 5/2002 |
| JP | 2004-210587 | | 7/2004 |
| WO | 94/05606 | | 3/1994 |
| WO | 2004/016668 | | 2/2004 |
| WO | WO 2004016668 | A1 * | 2/2004 |

OTHER PUBLICATIONS

Wako Technical Bulletin, "Macro azo initiators—VPS series and VPE series-", published by Wako Pure Chemical Industries, Ltd., pp. 1-11, Sep. 5, 2002.
English translation of Notice of Preliminary Rejection issued May 25, 2009 in Korean Application No. 10-2006-0091306 corresponding to present U.S. application.
Akira Ueda et al., "Block Copolymers Derived from Azobiscyanopentanoic Acid. VI. Synthesis of a Polyethyleneglycol—Polystyrene Block Copolymer", J. Polym. Sci.: Part A,: Polymer Chemistry, (U.S.A.), vol. 24, published by John Wiley & Sons, Inc., pp. 405-418, 1986.
Akira Ueda et al., "Block Copolymers Derived from Azobiscyanopentanoic Acid. V. Block copolymerization Initiated with a Polyethylene Glycol Containing Scissile Azo Linkages in Its Main Chain", J. Polym. Sci.: Part A; Polymer Chemistry, (U.S.A.), vol. 25, published by John Wiley & Sons, Inc., pp. 3495-3498, 1987.
Indian Office Action issued Nov. 9, 2009 in the Indian application corresponding to the present US application.
Communication from the EPO dated Sep. 30, 2009 issued in connection with the European application corresponding to the present US application.
English translation of Office Action issued Jul. 24, 2009 in the Chinese Application corresponding to the present U.S. Application.

* cited by examiner

*Primary Examiner*—David Wu
*Assistant Examiner*—Michael M Bernshteyn
(74) *Attorney, Agent, or Firm*—Wenderoth, Lind & Ponack, L.L.P.

(57) ABSTRACT

The present invention provides a novel polymer, and a mixture and a cement admixture thereof. The cement admixture has higher dispersibility compared to the previous ones. The novel polymer of the present invention has a different structure from the conventional copolymers used for cement admixtures, using an unsaturated carboxylic acid monomer and an unsaturated polyalkylene glycol monomer as the monomer components.

The novel polymer of the present invention basically contains a polyalkylene glycol chain and a polymer segment bonded to the chain. Another type of the novel polymer of the present invention contains two polyalkylene glycol chains and a polymer segment connecting the chains. In these polymers, at least one of unsaturated monomers constituting the polymer segment is an unsaturated carboxylic acid monomer or an unsaturated polyalkylene glycol monomer. The cement admixture of the present invention comprises a polymer, made from these monomers, or a mixture thereof.

6 Claims, No Drawings

POLYMER AND CEMENT ADMIXTURE USING THE SAME

BACKGROUND OF THE INVENTION

1. Field of the Invention

The present invention relates to a novel polymer and cement admixture comprising the same.

2. Description of the Related Art

A cement admixture is usually added to a cement composition (including, cement paste prepared by adding water thereinto, mortar prepared by mixing sand as fine aggregate thereinto, and concrete prepared by mixing pebble as coarse aggregate thereinto) for enhancing the durability and strength by reducing of the unit quantity of water. A cement admixture also has function of preventing cement particles from being agglutinated by absorbed to the cement particles and enhancing the dispersibility of the cement composition in use.

As a cement admixture, for instance, naphthalene series and polycarboxylic acid series are known. The Japanese Patent Application Laid-Open No. 2001-220417, for instance, discloses that a copolymer used for cement admixtures, prepared by copolymerization of an unsaturated carboxylic monomer and an unsaturated polyalkylene glycol monomer.

This copolymer, used for cement admixtures, including a carboxylic group derived from an unsaturated carboxylic monomer can act as an absorbing group which is absorbed to the cement particles, and a polyalkylene glycol chain derived from an unsaturated polyalkylene glycol ether series monomer can act as a dispersing group which disperses the cement particles.

However, a copolymer used for cement admixtures such as the one disclosed in the Japanese Patent Application Laid-Open No. 2001-220417, can be a cement admixture exhibiting certain dispersing ability by means of the steric repulsion of the polyalkylene glycol chain derived from the unsaturated polyalkylene glycol ether series monomer. In addition, it is required that the development of cement admixtures which can exhibit further higher dispersing abilities in order to reduce the quantity of cement admixtures.

On the other hand, in Wako Technical Bulletin, "Polymeric azo initiators—VPS series and VPE series—", published by Wako Pure Chemical Industries, Ltd., polymeric azo initiators, having polyethylene glycol chains, and block copolymers consisting of polyethylene glycol chain unit and methyl methacrylate or styrene unit, are disclosed and explained.

Furthermore, in "Block Copolymers Derived from Azobiscyanopentanoic Acid. VI. Synthesis of a Polyethylene glycol-Polystyrene Block Copolymer", J. Polym. Sci.: Part A,: Polymer Chemistry, (U.S.A.) published by John Wiley & Sons, Inc, on page 405-418, vol. 24 in 1986, Akira Ueda et al., and "Block Copolymerization Initiated with a Polyethylene Glycol Containing Scissile Azo Linkages in Its Main Chain", J. Polym. Sci.: Part A: Polymer Chemistry, (U.S.A.), published by John Wiley & Sons, Inc, on page 3495-3498, vol. 25, 1987, Akira Ueda et al., a production method of polymeric azo initiators with polyethylene glycol are disclosed and explained block copolymers consisting of polyethylene glycol chains and styrene, methyl methacrylate, methyl acrylate, vinyl acetate, or acrylonitrile.

SUMMARY OF THE INVENTION

However, in the use of the block copolymers disclosed in the above three non-patent literatures, steric repulsion caused by the polyethylene glycol chain are, to some extent, expected but these block copolymers are not able to be used as cement admixtures because they do not have the structural segments adsorbed to cement particles.

Under the above-mentioned circumstances, the purpose of this invention is to provide the novel polymer and the mixture thereof, having a different structure from the conventional copolymers used for cement admixtures, with an unsaturated carboxylic monomer or an unsaturated polyalkylene glycol monomer as a monomer component, and provide a cement admixture with higher dispersing ability, comprising the above polymer or the mixture.

The inventors found that, through the various research of the above problem and the completion of the present invention on the occasion of producing copolymer used for a cement admixture such as described in the above Japanese Patent Application Laid-Open No. 2001-220417, a novel polymer, having a structure with a new polyalkylene glycol chain, is prepared by using a polymerization initiator having a polyethylene glycol chain and radical-generating segment and/or a polymeric chain transfer agent having polyalkylene glycol chain, and the polymer has higher dispersing ability.

In another word, this invention provides a polymer which comprises a polyalkylene glycol chain and a polymer segment including a constituent unit, bound to one or both end(s) of the polyalkylene glycol chain, derived from an unsaturated monomer, wherein at least one kind of the unsaturated monomers constituting the polymer segment, is an unsaturated carboxylic monomer or an unsaturated polyalkylene glycol series monomer.

In addition, this invention provides a polymer containing a polyalkylene glycol chain and a polymer repeatedly comprising a block polymer unit consisting of a polyalkylene glycol chain and a polymer segment including a constituent unit derived from unsaturated monomers bonded to one end of said polyalkylene glycol chain, wherein at least one kind of the unsaturated monomers constituting said polymer segment is an unsaturated carboxylic acid monomer or an unsaturated polyalkylene glycol monomer.

Also this invention provides a polymer comprising two polyalkylene glycol chains and a polymer segment, wherein the polymer segment connects the polyalkylene glycol chains, the polymer segment contains constitutional unit made from an unsaturated monomer, and at least one of the unsaturated monomer is an unsaturated carboxylic acid monomer or an unsaturated polyalkylene glycol monomer.

Regarding the above polymer, said polymer segment may include a polymer derived from monomer component containing an unsaturated carboxylic acid monomer, or a polymer derived from a monomer component containing an unsaturated carboxylic acid monomer and an unsaturated polyalkylene glycol monomer.

Also, this invention provides a polymer prepared by polymerization of at least one kind of the unsaturated carboxylic acid monomers and the unsaturated polyalkylene glycol monomers, wherein the reaction of the polymerization is carried out of at least one selected from a group consisting of a polymerization initiator having a polyalkylene glycol chain and a radical generation segment, and chain transfer agents having a polyalkylene glycol chain.

And also, this invention provides a polymer mixture containing:

a polymer having a polyalkylene glycol chain and a polymer segment including a constituent unit derived from an unsaturated monomer bonded to both ends of said polyalkylene glycol chain, wherein at least one of the unsaturated monomers constituting the polymer segment is an unsaturated carboxylic acid monomer or an unsaturated polyalkylene glycol monomer;

a polymer repeatedly comprising a block polymer unit consisting of a polyalkylene glycol chain and a polymer segment including a constituent unit derived from unsaturated monomers bonded to one end of said polyalkylene glycol chain, wherein at least one kind of the unsaturated monomers constituting said polymer segment is an unsaturated carboxylic acid monomer or an unsaturated polyalkylene glycol monomer, and;

a polymer having a polyalkylene glycol chain and a polymer segment including a constituent unit derived from an unsaturated monomer bonded to an end of the polyalkylene glycol chain, wherein at least one kind of the unsaturated monomers having the polymer segment is an unsaturated carboxylic acid monomer or an unsaturated polyalkylene glycol monomer.

Furthermore, this invention provides a polymer mixture containing:

a polymer having a polyalkylene glycol chain and a polymer segment including a constituent unit derived from an unsaturated monomer bonded to both ends of said polyalkylene glycol chain, wherein at least one of the unsaturated monomers constituting the polymer segment is an unsaturated carboxylic acid monomer or an unsaturated polyalkylene glycol monomer;

a polymer repeatedly comprising a block polymer unit consisting of a polyalkylene glycol chain and a polymer segment including a constituent unit derived from unsaturated monomers bonded to one end of said polyalkylene glycol chain, wherein at least one kind of the unsaturated monomers constituting said polymer segment is an unsaturated carboxylic acid monomer or an unsaturated polyalkylene glycol monomer, and;

a polymer prepared by polymerization of monomer components including at least one kind of the unsaturated carboxylic acid monomers and the unsaturated polyalkylene glycol monomers.

In addition, this invention provides a polymer mixture containing:

a polymer having a polyalkylene glycol chain and a polymer segment including a constituent unit derived from an unsaturated monomer bonded to an end of said polyalkylene glycol chain, wherein at least one of the unsaturated monomers constituting the polymer segment is an unsaturated carboxylic acid monomer or an unsaturated polyalkylene glycol monomer;

a polymer comprising two polyalkylene glycol chains and a polymer segment, wherein the polymer segment connects the polyalkylene glycol chains, the polymer segment contains constitutional unit made from an unsaturated monomer, and at least one of the unsaturated monomer is an unsaturated carboxylic acid monomer or an unsaturated polyalkylene glycol monomer.

Moreover, this invention provides a polymer mixture containing:

a polymer having a polyalkylene glycol chain and a polymer segment including a constituent unit derived from an unsaturated monomer bonded to an end of said polyalkylene glycol chain, wherein at least one kind of unsaturated monomers constituting the polymer segment is an unsaturated carboxylic acid monomer or an unsaturated polyalkylene glycol monomer;

a polymer comprising two polyalkylene glycol chains and a polymer segment, wherein the polymer segment connects the polyalkylene glycol chains, the polymer segment contains constitutional unit made from an unsaturated monomer, and at least one of the unsaturated monomer is an unsaturated carboxylic acid monomer or an unsaturated polyalkylene glycol monomer, and;

a polymer prepared by polymerization of at least one kind of the unsaturated carboxylic acid monomers and the unsaturated polyalkylene glycol monomers.

Regarding said polymer mixture, wherein the polymer segment is, in some instances, a polymer obtained by polymerization of unsaturated carboxylic acid monomers or one obtained by polymerization of unsaturated carboxylic acid monomers and unsaturated polyalkylene glycol monomers.

And also this invention provides a polymer mixture prepared by polymerization of at least one selected from a group consisting of unsaturated carboxylic acid monomers and unsaturated polyalkylene glycol monomers, wherein the reaction of the polymerization is carried out by using at least one selected from a group consisting of a polymerization initiator having a polyalkylene glycol chain and a radical generation segment, and a chain transfer agent having a polyalkylene glycol chain.

And this invention provides a cement admixture containing at least one selected from a group consisting of the polymers and polymer mixtures.

EFFECT OF THE INVENTION

According to this invention, the novel polymer having more enhanced dispersibility compared to the conventional copolymers for cement admixtures prepared by copolymerization of unsaturated carboxylic acid monomers and unsaturated polyalkylene glycol monomers. The cement admixture containing the novel polymer can exhibit a highly enhanced dispersibility, so that the amount of the usage thereof in preparing the cement composition can be reduced.

DESCRIPTION OF THE PREFERRED EMBODIMENT

<Novel Polymer>

A novel polymer in this invention is represented by the formula (1) or (2) as schematically shown below;

(BL)-(PAG)-(BL)  (1)

(In the above formula, PAG means a polyalkylene glycol chain, BL means a polymer segment containing a constituent unit derived from an unsaturated monomer.)

(PAG)-(BL)  (2)

(In the above Formula, PAG means a polyalkylene glycol chain, BL means a polymer segment containing constituent unit derived from an unsaturated monomer.), wherein the polymer contains a polyalkylene glycol chain and a polymer segment including a constituent unit derived from the unsaturated monomer bonded to at least one end of said polyalkylene glycol chain and at least one kinds of the unsaturated monomers constituting said polymer segment is an unsaturated carboxylic acid monomer or an unsaturated polyalkylene glycol monomer.

Also another novel polymer has a repeating unit represented by the formula (3) as schematically shown below;

*-[(PAG)-(BL)]-*  (3)

(In the above Formula, PAG means a polyalkylene glycol chain, BL means a polymer segment containing constituent unit derived from an unsaturated monomer.), wherein the polymer repeatedly comprising a block polymer unit consisting of a polyalkylene glycol chain and a polymer segment including a constituent unit derived from unsaturated monomers bonded to one end of said polyalkylene glycol chain, wherein at least one kind of the unsaturated monomers constituting said polymer segment is an unsaturated carboxylic acid monomer or an unsaturated polyalkylene glycol monomer.

In addition, another novel polymer is represented by the formula (4) as schematically shown below;

(In the above Formula, PAG means a polyalkylene glycol chain, BL means a polymer segment containing a constituent unit derived from an unsaturated monomer.), wherein the polymer comprising two polyalkylene glycol chains and a polymer segment, wherein the polymer segment connects the polyalkylene glycol chains, the polymer segment contains constitutional unit made from an unsaturated monomer, and at least one of the unsaturated monomer is an unsaturated carboxylic acid monomer or an unsaturated polyalkylene glycol monomer.

The novel polymers in this invention are further concretely classified into eight kinds of polymer as described below.

Polymer (1): A polymer having a polyalkylene glycol chain and a polymer segment including a constituent unit derived from an unsaturated monomer bonded to both ends of said polyalkylene glycol chain, wherein at least one kind of the unsaturated monomers constituting the polymer segment is an unsaturated carboxylic acid monomer.

Polymer (2): A polymer having a polyalkylene glycol chain and a polymer segment including a constituent unit derived from an unsaturated monomer bonded to both ends of said polyalkylene glycol chain, wherein at least two kinds of the unsaturated monomers constituting the polymer segment are an unsaturated carboxylic acid monomer and an unsaturated polyalkylene glycol monomer.

Polymer (3): A polymer repeatedly comprising a block polymer unit consisting of a polyalkylene glycol chain and a polymer segment including a constituent unit derived from unsaturated monomers bonded to one end of said polyalkylene glycol chain, wherein at least one kind of the unsaturated monomers constituting said polymer segment in the block polymer unit is an unsaturated carboxylic acid monomer.

Polymer (4): A polymer repeatedly comprising a block polymer unit consisting of a polyalkylene glycol chain and a polymer segment including a constituent unit derived from unsaturated monomers bonded to one end of said polyalkylene glycol chain, wherein at least two kinds of the unsaturated monomers constituting the polymer segment are an unsaturated carboxylic acid monomer and an unsaturated polyalkylene glycol monomer.

Polymer (5): A polymer having a polyalkylene glycol chain and a polymer segment including a constituent unit derived from an unsaturated monomer bonded to an end of said polyalkylene glycol chain, wherein at least one kind of the unsaturated monomers is an unsaturated carboxylic acid monomer.

Polymer (6): A polymer having a polyalkylene glycol chain and a polymer segment including a constituent unit derived from an unsaturated monomer bonded to an end of said polyalkylene glycol chain, wherein at least two kinds of the unsaturated monomers are an unsaturated carboxylic acid monomer and an unsaturated polyalkylene glycol monomer.

Polymer (7): A polymer having two polyalkylene glycol chains and a polymer segment including a constituent unit derived from an unsaturated monomer connecting said polyalkylene glycol chains, wherein at least one kind of the unsaturated monomers is unsaturated carboxylic acid monomer.

Polymer (8): A polymer having two polyalkylene glycol chains and a polymer segment including a constituent unit derived from an unsaturated monomer connecting said polyalkylene glycol chains, wherein at least two kinds of the unsaturated monomers are an unsaturated carboxylic acid monomer and an unsaturated polyalkylene glycol monomer.

Hereinafter, a polyalkylene glycol chain described as PAG in the above formulae (1) to (4) is referred to as "polyalkylene glycol chain (1)", and a polyalkylene glycol chain derived from an unsaturated polyalkylene glycol monomer constituting a polymer segment represented by BL is occasionally referred to as "polyalkylene glycol chain (2)". Polyalkylene glycol chain (1) and (2) is preferably to be substantially linear.

The mean molecular weight of the novel polymer in this invention is preferably more than 10,000, more preferably more than 15,000, even more preferably more than 20,000, and especially more preferably more than 25,000, as well as, is preferably less than 300,000, more preferably less than 200,000, even more preferably less than 150,000, and especially preferably less than 100,000. The mean molecular weight is measured by the method described in Example.

Regarding the novel polymer in this invention, the length of a polyalkylene glycol chain (1) is not limited because it depends on the kinds of the polymerization initiator and the chain transfer agent to be used. However, for instance, in the case of adding to a cement admixture composition, from a viewpoint of effectively dispersing the cement particles, the mean addition molecular number of alkylene oxide is preferably more than 10 mole, more preferably more than 20 mole, even more preferably more than 30 mole, further preferably more than 40 mole, more further preferably more than 50 mole, furthermore preferably more than 80 mole, moreover preferably more than 100 mole, and especially more preferably more than 130 mole, as well as, is preferably less than 500 mole, more preferably less than 400 mole, even more preferably less than 350 mole, and further preferably less than 300 mole, more further preferably less than 280 mole, furthermore preferably less than 250 mole, moreover preferably less than 220 mole, and especially preferably less than 200 mole.

The polyalkylene glycol chain (1) seems to have, as described in Example below, more enhanced steric repulsion effect when it is moderately long. On the other hand, when the length of the polyalkylene glycol chain (1) is too short, the steric repulsion effect is not enough and the dispersing effect is the same as the publicly known copolymers for cement admixture.

Alkylene glycol constituting the polyalkylene glycol chain (1) is to be an alkylene glycol having 2 to 18 carbon atoms, however for instance, from a viewpoint of enhancing cement particle dispersibility or hydrophilicity, it is preferable that the alkylene glycol is to be one having 2 to 4 carbon atoms in the case of cement admixture compositions.

Further, alkylene glycol constituting the polyalkylene glycol chain (1) is required to have enhanced hydrophilicity from a viewpoint of effectively dispersing cement particles in the case of cement admixture compositions and is preferable to mainly be an ethylene glycol unit thereof having 2 carbon atoms. The ratio of ethylene glycol unit in polyalkylene glycol chain (1) is preferably more 50 mol %, more preferably more than 60 mol %, further preferably more than 70 mol %, especially preferably more than 80 mol %.

The constituent unit of polyalkylene glycol chain (2) is preferable to be mainly ethylene glycol unit, and the ratio of ethylene glycol unit in polyalkylene glycol chain (2) is preferably more than 50 mol %, more preferably more than 60 mol %, further preferably more than 70 mol %, especially preferably more than 80 mol %. As the other constituent units, for instance, propylene glycol unit or butylene glycol unit or so are applicable. The ratio of the other components is preferable to be less than 50 mol %, more preferably less than 40 mol %, further preferably less than 30 mol %, especially preferably less than 20 mol %.

Regarding the novel polymer of the present invention, a polymer segment bonded to the polyalkylene glycol chain (1) is constituted by plural unsaturated monomers, wherein at least one of the monomers is unsaturated carboxylic acid monomer or unsaturated polyalkylene glycol monomer. Applicable unsaturated carboxylic acid monomers and unsaturated polyalkylene glycol monomers in the present invention are described in detail hereinafter.

The novel polymer in this invention has carboxyl group(s) derived from unsaturated carboxylic acid monomers, or occasionally has polyalkylene glycol chain (2) derived from unsaturated polyalkylene glycol monomers. Therefore, the number of carboxyl groups, or the length or number of the polyalkylene glycol chain (2) depends on the kind or amount of unsaturated carboxylic acid monomers or unsaturated polyalkylene glycol monomers being used, so they are not limited.

Since the novel polymer in this invention basically has carboxyl group(s) derived from unsaturated carboxylic acid at one or both end(s) of the polyalkylene glycol chain (1), for instance, it is thought that the polymer can be absorbed to cement particles at the carboxyl group and can effectively disperse the cement particles with steric repulsion derived from the polyalkylene glycol chain (1). Also the novel polymer in this invention occasionally has polyalkylene glycol chain (2) derived from unsaturated polyalkylene glycol monomers at one or both end(s) of the polyalkylene glycol chain (1), so steric repulsion derived from polyalkylene glycol chain (2) is added to that derived from polyalkylene glycol chain (1), for instance, the cement dispersibility seems to be enhanced in a synergistic manner.

<Production of the Novel Polymer>

The novel polymer in this invention is obtained by polymerization of an unsaturated carboxylic acid monomer (hereinafter referred to as "monomer (A)") and an unsaturated polyalkylene glycol monomer (hereinafter referred to as "monomer (B)") in the presence of a polymerization initiator having a polyalkylene glycol chain and a radical generation segment, and/or a polymeric chain transfer agent having a polyalkylene glycol chain.

As monomer (A), for instance, formula (5) shown below is applicable.

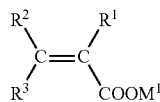

(5)

(In the above Formula, $R^1$, $R^2$ and $R^3$ are, being independent on each other, hydrogen atom, methyl group, or $-(CH_2)_x COOM^2$ (wherein, $-(CH_2)_x COOM^2$ is able to form anhydride with $-COOM^1$ or the other $-(CH_2)_x COOM^2$), and x is an integral number from 0 to 2, $M^1$ and $M^2$, being independent on each other, is hydrogen atom, monovalent metal atom, bivalent metal atom, trivalent metal atom, quaternary ammonium group, organic amine group.).

As concrete examples of monomer (A), for instance, monocarboxyl acid monomers such as acrylic acid, methacrylic acid or crotonic acid; dicarboxylic acid such as maleic acid, itaconic acid or fumaric acid; anhydride or salt (for instance, alkaline metal salt, alkaline-earth metal salt, trimetallic salt, ammonium salt or organic amine salt) of these carboxylic acid. The monomers are used alone or in combination thereof. Among these monomer, from a viewpoint of polymerization ability, acrylic acid, methacrylic acid, maleic acid, maleic acid anhydride or the salt thereof is preferable, furthermore, acrylic acid, methacrylic acid or the salt thereof is more preferable.

As monomer (B), for instance, formula (6) shown below is applicable.

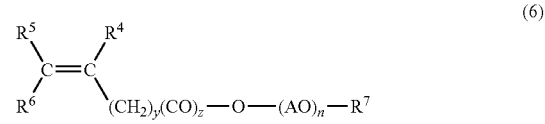

(6)

(In the above Formula, $R^4$, $R^5$ and $R^6$ are, being independent on each other, hydrogen atom or methyl group, $R^7$ is hydrogen atom or hydrocarbon group having 1 to 20 carbon atom, AO expresses, being independent on each other, one or more than two kinds of oxyalkylene group having 2 to 18 carbon atoms (wherein, more than two kinds of oxyalkylene group being introduced as block form or random form is applicable), and y is an integral number from 0 to 2, z is an integral number of 0 or 1, and n is an integral number from 1 to 300 expressing mean molecular number of added oxyalkylene group.)

In the above Formula (6), as hydrocarbon group having 1 to 20 carbon atoms described as $R^7$, aliphatic alkyl group having 1 to 20 carbon atoms, cycloaliphatic alkyl group having 3 to 20 carbon atoms, alkenyl group having 2 to 20 carbon atoms, alkynyl group having 2 to 20 carbon atoms, or aryl group having 6 to 20 carbon atoms are applicable.

In the above Formula (6), group $R^7$ is, from a viewpoint of cement particle dispersibility, preferably hydrophilic group, more concretely, hydrogen atom or alkyl group having 1 to 10 carbon atoms, more preferably hydrogen atom or alkyl group having 1 to 5 carbon atoms, further preferably hydrogen atom or alkyl group having 1 to 3 carbon atoms.

In the above Formula (6), the part described as $-(AO)_n-$ is the polyalkylene glycol chain (2). The oxyalkylene group described as AO is required to have enhanced hydrophilicity from a viewpoint of effective cement particle dispersibility, and mainly to be oxyalkylene group having 2 carbon atoms. The ratio of oxyalkylene group having 2 carbon atoms in oxyalkylene chain having n numbers or oxyalkylene group is preferably more than 50 mol %, more preferably more than 60 mol %, further preferably more than 70 mol %, especially preferably more than 80 mol %.

Further, in the case of preparation of a concrete composition by adding to cement admixture, from a viewpoint of reducing viscosity or stiffing of the concrete, it is preferable to make some network among cement particles by introducing oxyalkylene groups having more than three carbon atoms into an oxyalkylene chain, and make it to some extent hydrophobicity. However, too much introduction of oxyalkylene groups having more than three carbon atoms might cause reduction of cement particle dispersibility because of enhancing the hydrophobicity of prepared polymer. Therefore the ratio of oxyalkylene group having more than three carbon atoms in oxyalkylene chain is preferably more than 1 mol %, more preferably more than 3 mol %, even more preferably more than 5 mol %, and especially more preferably more than 7 mol %, as well as, preferably less than 50 mol %, more preferably less than 40 mol %, even more preferably less than 30 mol %, and especially more preferably less than 20 mol %. Oxyalkylene group having 3 carbon atoms in oxyalkylene chain is able to be introduced in block form or random form, but introduction in block form, such as: oxyalkylene chain having oxyalkylene group having more than 3 carbon atoms—oxyalkylene chain containing oxyalkylene group having 2 carbon atoms—oxyalkylene chain containing oxyalkylene group having more than 3 carbon atoms, is preferable.

Oxyalkylene group having 3 to 8 carbon atoms is desirable as the oxyalkylene group having more than 3 carbon atoms, for convenience for introduction or affinity with cement particles. Oxypropylene group having 3 carbon atoms or oxybutylene group having 4 carbon atoms are especially desirable for the oxyalkylene group.

In the above Formula (6), the mean molecular number of added oxyalkylene group expressed as n is normally more than 1, preferably more than 4, more preferably more than 10, even more preferably more than 15, further preferably more than 20, more further preferably more than 25, and especially preferably more than 30, as well as, is normally less than 300, preferably less than 280, more preferably less than 250, even more preferably less than 220, further preferably less than 200, more further preferably less than 180, and especially preferably less than 150.

As concrete example of monomer (B) shown in the above formula (6), for instance, alkoxypolyalkylene glycol prepared by adding alkyleneoxide having 2 to 18 carbon atoms to any of a compound selected from a group consisting of saturated aliphatic alcohols having 1 to 20 carbon atoms such as methanol, ethanol, 1-propanol, 2-propanol, 1-butanol, 2-butanol, 1-pentanol, 1-hexanol, octanol, 2-ethyl-1-hexanol, nonylalcohol, laurylalcohol, cetylalcohol, stearylalcohol, unsaturated aliphatic alcohol having 3 to 20 carbon atoms such as allylalcohol, methallylalcohol, crotylalcohol, oleylalcohol, alicyclicalcohol having 3 to 20 carbon atoms such as cyclohexanol and aromatic alcohol having 6 to 20 carbon atoms such as phenol, phenylmethanol (benzylalcohol), methylphenol (cresol), p-ethylphenol, dimethylphenol (xylenol), nonylphenol, dodecylphenol, phenylphenol, naphthol: ester compound prepared by esterification of polyalkylene glycol which is a polymer of alkyleneoxide having 2 to 18 carbon atoms and (metha-) acrylic acid or crotonic acid are able to be used. The monomers are used alone or in combination thereof. In these monomers, alkoxypolyalkylene glycol ester with (metha-) acrylic acid is preferable.

Further, compound being added 1 to 300 mole of alkyleneoxide to an unsaturated alcohol such as vinylalcohol, allylalcohol, methallylalcohol, 3-butene-1-ol, 3-methyl-3-butene-1-ol, 3-methyl-2-butene-1-ol, 2-methyl-3-butene-2-ol, 2-methyl-2-butene-1-ol, 2-methyl-3-butene-1-ol, hydroxypropylvinylether, hydroxybutylvinylether are able to be used. The compounds are used alone or in combination thereof. In these compounds, especially a compound containing (meth-) allylalcohol, 3-methyl-3-butene-1-ol is preferable. Regarding the above unsaturated esters or unsaturated ethers, as alkylene oxides, for instance, adding one or more of alkylene oxides having 2 to 18 carbon atoms selected from a group consisting of such as ethylene oxide, propylene oxide, butylene oxide, and styrene oxide is applicable. In the case of adding more than 2 of alkylene oxides, any of random addition, block addition, or alternate addition is applicable.

In the above polymerization reaction, besides monomer (A) and monomer (B), monomer, being able to be used for copolymerization (hereinafter referred to as "monomer (C)"), can be used.

As monomer (C), monoester or diester of unsaturated dicarboxylic acid such as maleic acid, fumalic acid, itaconic acid or citraconic acid and alkylalcohol having 1 to 20 carbon atoms, glycol having 2 to 18 carbon atoms or polyalkylene glycol wherein 2 to 300 mol of these glycol are added or alkoxy polyalkylene oxide of 2 to 300 mol of alkylene oxide being added, wherein alkylene oxide having 2 to 18 carbon atoms are added to alkylalcohol having 1 to 20 carbon atoms, and, monoamide, diamide of these unsaturated dicarboxylic acids and alkylamine having 1 to 20 carbon atoms, one-side aminated glycol having 2 to 18 carbon atoms, or one-side aminated polyalkylene glycol wherein 2 to 300 mol of these glycol are added; ester of unsaturated monocarboxylic acid such as acrylic acid, methacrylic acid or crotonic acid and alkylalcohol having 1 to 20 carbon atoms, glycol having 2 to 18 carbon atoms or polyalkylene glycol wherein 2 to 300 mol of these glycol are added or alkoxypolyalkylene glycol of 2 to 300 mol of alkyleneoxide being added wherein alkyleneoxide having 2 to 18 carbon atoms are added to alkylalcohol having 1 to 20 carbon atoms, and, amide of these unsaturated monocarboxylic acid alkylamine having 1 to 20 carbon atoms, one-side aminated glycol having 2 to 18 carbon atoms, or one-side aminated polyalkylene glycol wherein 2 to 300 mol of these glycol are added; unsaturated sulfonic acid such as sulfoethylacrylate, sulfoethylmethacrylare, 2-methylpropane sulfonic acid acrylamid, 2-methylpropane sulfonic acid methacrylamide, stylene sulfonic acid, or these monovalent metal salt, divalent metal salt, ammonium salt or organic amine salt; unsaturated amid such as acrylamide, methacryl amide, acrylalkyl amide methacryl alkylamid; unsaturated amino compound such as dimethyl amino ethyl aclylate, dimethyl amino ethyl methacrylate; vinyl ester such as vinyl acetate, vinyl propionate; vinyl ether such as methyl vinylether, ethyl vinylether, propyl vinylether, alkylvinylether having 3 to 20 carbon atoms such as butyl vinylether; aromatic vinyl compound such as stylene; are able to be used. The monomers are used alone or in combination thereof.

The quantity of monomer (A), monomer (B) and monomer (C) used in the above polymerization reaction is, in ratio (by mass %) of monomer (A)/monomer (B)/monomer (C), in the case of monomer (A) being main component, preferably 100 to 50/0 to 50/0 to 40, more preferably 100 to 55/0 to 45/0 to 40, even more preferably 100 to 60/0 to 40/0 to 40, and especially preferably 100 to 65/0 to 35/0 to 40, as well as, in the case of monomer (B) being main component, preferably 2 to 50/98 to 50/0 to 40, more preferably 5 to 45/95 to 55/0 to 40, and even more preferably 7.5 to 40/92.5 to 60/0 to 40.

A carboxyl group derived from an unsaturated carboxylic acid monomer in the novel polymer in this invention is introduced by using monomer (A) in the above polymerization reaction. Therefore, monomer (A) is essential for the above polymerization reaction. Also, polyalkylene glycol chain (2) derived from an unsaturated polyalkylene glycol monomer in the novel polymer in this invention is introduced by using monomer (B) in the above polymerization reaction. Therefore, monomer (B) is able to be used in the above polymerization reaction, as occasion demands.

In the above polymerization reaction, the relation between the quantity of polyalkylene glycol chain (1) and the quantity of monomer (A), monomer (B), and monomer (C) is, in ratio (by mass %) of (polyalkylene glycol chain (1))/(monomer (A)+monomer (B)+monomer (C)), in the case of monomer (A) being main component, preferably 40/60 to 99/1, more preferably 45/55 to 97/3, even more preferably 50/50 to 95/5, and especially preferably 55/45 to 92.5/7.5, as well as, in the case of monomer (B) being main component, preferably 2/98 to 95/5, more preferably 4/96 to 90/10, even more preferably 8/92 to 80/20, further preferably 10/95 to 75/25, more further preferably 15/85 to 70/30, moreover preferably 17.5/82.5 to 65/35, and especially preferably 20/80 to 60/40. Especially, the quantity of monomer (A) is, in ratio (by mass %) of monomer (A)/(polyalkylene glycol chain (1)+monomer (B)+ monomer (C)), preferably 1 to 50/99 to 50, more preferably 2.5 to 40/97.5 to 60, and even more preferably 5 to 35/95 to 65.

Polyalkylene glycol chain (1), shown as formula (7) below, in the novel polymer in this invention, for instance, is introduced by using a polymeric azo reaction initiator, having a repeating unit containing an azo group and an alkylene glycol chain in the above polymerization reaction.

 (7)

[In the above formula, $R^8$ is independent to each other, organic group, and AO is independent to each other, mixture of one or more kinds of oxyalkylene group having 2 to 18 carbon atoms (here, more than two kinds of oxyalkylene groups may be introduced either in brick manner or in random order), m indicates a mean molecular number of added oxyalkylene group and is integral number of 10 to 500.] These polymeric azo reaction initiators are used alone or in combination thereof.

As a polymeric azo reaction initiator described in the above formula (7), is preferably selected from polymeric azo reaction initiators having a repeating unit shown as formula (8) below;

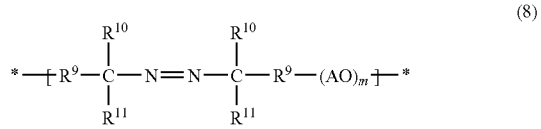 (8)

[In the above formula, $R^9$ is independent to each other, alkylene group having 1 to 20 carbon atoms (said alkylene group may be substituted by alkyl group, alkenyl group, hydroxide group, cyano group, carboxyl group or amino group), carbonyl group or carboxyl group, or group wherein alkylene group having 1 to 20 carbon atoms (said alkylene group may be substituted by alkyl group, alkenyl group, hydroxide group, cyano group, carboxyl group or amino group) bonded to carbonyl group or carboxyl group, $R^{10}$ is independent to each other, alkyl group having 1 to 20 carbon atoms, carboxy substituted alkyl group having 1 to 10 carbon atoms], phenyl group or substituted phenyl group, $R^{11}$ is independent to each other, cyano group, acetoxy group, carbamoyl group or (alkoxy)carbonyl group (having 1 to 10 carbon atoms), AO is independent to each other, mixture of one or more kinds of oxyalkylene groups having 2 to 18 carbon atoms (more than 2 kinds of oxyalkylene groups may be introduced in brick manner or in random order), m indicates a mean molecular number of added oxyalkylene group and is integral number of 10 to 500.], more preferably, is selected from polymeric azo reaction initiators, having a repeating unit shown as formula (9) below, can be listed.

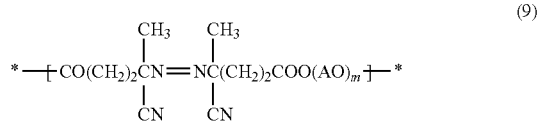 (9)

[In the above formula, AO is independent to each other, mixture of one or more kinds of oxyalkylene groups having 2 to 18 carbon atoms (more than two kinds of oxyalkylene group may be introduced in brick manner or in random order), m indicates a mean molecular number of added oxyalkylene group and is integral number of 10 to 500.]

Among polymeric azo reaction initiators having a repeating unit as the above formula (9), polymeric azo reaction initiators having AO, wherein AO is an oxyethylene group as the repeating unit, is especially preferable, and as a concrete example thereof, polymeric azo reaction initiator VPE series (available from Wako Pure Chemical Industries, Ltd.) such as VPE-0201 (mean molecular weight by number is approximately 15,000 to 30,000, molecular weight of polyethylene oxide part is approximately 2,000, m=45), VPE-0401 (mean molecular weight by number is approximately 25,000 to 40,000, molecular weight of polyethylene oxide part is approximately 4,000, m=90), VPE-0601 (mean molecular weight by number is approximately 25 to 40 k, molecular weight of polyethylene oxide part is approximately 6,000, m=135) are able to be used.

In the above formula (7), a mean molecular number of added oxyalkylene group indicated as m is preferably more than 10 mole, more preferably more than 20 mole, even more preferably more than 30 mole, further preferably more than 40 mole, more further preferably more than 50 mole, furthermore preferably more than 80 mole, moreover preferably more than 100 mole, and especially preferably more than 130 mole, as well as, less than 500 mole, preferably less than 400 mole, more preferably less than 350 mole, even more preferably less than 300 mole, further preferably less than 280 mole, more further preferably less than 250 mole, moreover preferably less than 220 mole, and especially preferably less than 200 mole.

When a polymeric azo reaction initiator as described above is used, azo group is dissolved by heat and radicals are generated, then the polymerization reaction is started at the segment. Therefore, polymer is formed by addition of monomers to one or both ends of a polyalkylene oxide having oxyalkylene groups. In this case, a polymer is mainly generated, which has a constituent unit containing carboxyl groups derived from monomer (A) at both ends of polyalkylene glycol chain (1), having m number of oxyalkylene groups, further has a constituent unit containing polyalkylene glycol chain (2) having n number of oxyalkylene groups derived from monomer (B) in the case of using monomer (B), and furthermore has constituent unit derived from monomer (C) in the case of using monomer (C). In addition to that, a polymer having two or more times repeats of said polymer structure, or a polymer is by-produced, which has a constituent unit having carboxyl groups derived from monomer (A) at one end of polyalkylene glycol chain (1) having m number of oxyalkylene groups, further has a constituent unit having polyalkylene glycol chain (2) having n number of oxyalkylene groups derived from monomer (B) in the case of using monomer (B), and furthermore has a constituent unit derived from monomer (C) in the case of using monomer (C).

By using the above novel polymer, in the case of polymerization reaction using polymeric azo reaction initiator having a repeating unit of the above formula (7), when monomer (A) is used alone, or monomer (A) and monomer (C) are used in combination, polymer (1), polymer (3) and polymer (5) are generated as polymer mixture (I). Further, when monomer (A) and monomer (B), or monomer (A), monomer (B) and monomer (C) are used, polymer (2), polymer (4) and polymer (6) are generated as polymer mixture (II).

The relationship between the blending quantity of the polymeric azo reaction initiator having a repeating unit in the above formula (7), and that of monomer (A), monomer (B), and monomer (C), in ratio (by mass %) of polymeric azo reaction initiator/(monomer (A)+monomer (B)+monomer (C)), in the case of monomer (A) being the main component, is preferably 40/60 to 99/1, more preferably 45/55 to 97/3, further preferably 50/50 to 95/5, especially preferably 55/45 to 92.5/7.5, in the case of monomer (B) being the main component, preferably 2/98 to 95/5, more preferably 4/96 to 90/10, more preferably 8/92 to 80/20, even more preferably 10/90 to 75/25, further preferably 15/85 to 70/30, more further preferably 17.5/82.5 to 65/35, especially preferably 20/80 to 60/40.

Alternatively, polyalkylene glycol chain (1) of the novel polymer in this invention is introduced by using a polymeric chain transfer agent of thiol species as, for instance, formula (10) as shown below,

$$HS—(R^{12})_j\text{-}(AO)_p—R^{13}—SH \quad (10)$$

[In the above formula, $R^{12}$ and $R^{13}$ is independent to each other, organic group, preferably linear chained or branched chained alkylene group having 1 to 18 carbon atoms, phenyl group, alkylphenyl group, pyridinyl group, aromatic group such as thiophene, pyrrole, furan, thiazole, or mercapto carboxylic acid group (wherein $R^{12}$ and $R^{13}$ may be partially substituted by hydroxyl group, amino group, cyano group, carbonyl group, carboxyl group, halogen group, sulfonyl group, nitro group of formyl group), AO is independent to each other, mixture of one or more kinds of oxyalkylene group having 2 to 18 carbon atoms (more than 2 kinds of oxyalkylene group may be introduced in brick manner or in random order), j is 0 or 1, p indicates a mean molecular number of added oxyalkylene group and is integral number of 10 to 500.];

or a polymeric chain transfer agent of thiol species as, for instance, formula (11) as shown below,

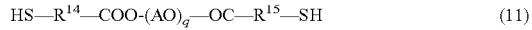

$$HS—R^{14}—COO\text{-}(AO)_q—OC—R^{15}—SH \quad (11)$$

[In the above formula, $R^{14}$ and $R^{15}$ is independent to each other, mercapto carboxylic acid group, preferably linear chained or branched chained alkylene group having 1 to 18 carbon atoms, phenyl group, alkylphenyl group, pyridinyl group, aromatic group such as thiophene, pyrrole, furan, thiazole (wherein $R^{14}$ and $R^{15}$ may be partially substituted by hydroxyl group, amino group, cyano group, carbonyl group, carboxyl group, halogen group, sulfonyl group, nitro group or formyl group), AO is independent to each other, mixture of one or more kinds of oxyalkylene group having 2 to 18 carbon atoms (more than 2 kinds of oxyalkylene group may be introduced in brick manner or in random order), q indicates a mean molecular number of added oxyalkylene group and is integral number of 10 to 500.];

or a polymeric chain transfer agent of allyl species as, for instance, formula (12) as shown below in the above polymerization reaction.

$$CH_2=CHCH_2—O\text{-}(AO)_r—CH_2CH=CH_2 \quad (12)$$

[In the above formula, AO is independent to each other, mixture of one or more kinds of oxyalkylene group having 2 to 18 carbon atoms (more than 2 kinds of oxyalkylene group may be introduced in brick manner or in random order), r indicates a mean molecular number of added oxyalkylene group and is integral number of 10 to 500.]

As concrete examples of these polymeric chain transfer agent, for instance, compounds wherein —OH group is substituted by —SH group by reaction of thiocarboxylic acid such as thioacetic acid or thiobenzoic acid to —OH group in both ends of polyalkylene glycol using halogenated zinc and alkali hydrolysis; compounds wherein, in the presence of polyalkylene glycol and thioacetate, after a reaction between azo dicarboxylic acid diethyl (DEAD) and triphenyl phosphyne, by alkali hydrolysis, —OH group in both ends of polyalkylene glycol are substituted by —SH group; compounds wherein —OH group in both ends of polyalkylene glycol is allylated by SN2 reaction using halogenated allyl compound such as allyl bromide; compounds having a double bond such as allyl group at both ends of polyalkylene glycol, are substituted by —SH group by alkali hydrolysis after addition of thiocarboxylic acid such as thioacetate or thiobenzoic acid; compounds wherein mercapto carbonic acid such as mercapto acetic acid, mercapto propyonic acid, mercapto benzyl acid, cystein, mercapto nicotinate, mercapto thiazole acetic acid are esterificated to —OH group in both ends of polyalkylene glycol; are able to be used. These polymeric chain transfer agents are able to be used alone or in combination thereof.

In the above formula (11), a linear chained or branched chained alkylene group having 2 to 18 carbon atoms is preferable as mercapto carboxylic acid group expressed by $R^{14}$ or $R^{15}$, from a viewpoint of hydrolysis resistance.

In the above-mentioned formula (10), formula (11) or formula (12), a mean molecular number of added oxyalkylene group indicated as p, q or r is preferably more than 10 mole, more preferably more than 20 mole, even more preferably more than 30 mole, further preferably more than 40 mole, more further preferably more than 50 mole, furthermore preferably more than 80 mole, moreover preferably more than 100 mole, and especially preferably more than 130 more, as well as, preferably less than 500 mole, more preferably less than 400 mole, even more preferably less than 350 mole, further preferably less than 300 mole, more further preferably less than 280 mole, furthermore preferably less than 250 mole, moreover preferably less than 220 mole, especially preferably less than 200 mole.

In the above-mentioned formula (10), formula (11) or formula (12), the part described as $\text{-}(AO)_p\text{-}$, $\text{-}(AO)_q\text{-}$, or $\text{-}(AO)_r\text{-}$ corresponds to polyalkylene glycol chain (1). Here, oxyalkylene group described as AO needs to have enhanced hydrophilicity from a viewpoint of effectively dispersing cement particles when added to cement admixture, and is preferable to be mainly oxyalkylene group having 2 carbon atoms. The ratio of oxyalkylene groups having 2 carbon atoms in oxyalkylene chain containing n numbers of oxyalkylene groups is preferably more than 50 mol %, more preferably more than 60 mol %, further preferably more than 70 mol %, and especially preferably more than 80 mol %.

Further, in the case of preparation of a concrete composition by adding to cement admixture, from a viewpoint of reducing viscosity or stiffing of the concrete, it is preferable to make some structure (network) among cement particles by introduction of oxyalkylene groups having more than 3 carbon atoms into oxyalkylene chain in order to make the chain be to some extent hydrophobic. However too much introduction of oxyalkylene groups having more than 3 carbon atoms might cause reduction of cement particle dispersibility because of the enhancement of the hydrophobicity of the prepared polymer. Therefore, the ratio of oxyalkylene groups having more than 3 carbon atoms in oxyalkylene chain is preferably more than 1 mol %, more preferably more than 3 mol %, further preferably more than 5 mol %, and especially preferably more than 7 mol %, as well as, preferably less than 50 mol %, more preferably less than 40 mol %, further preferably less than 30 mol %, especially preferably less than 20 mol %. Oxyalkylene groups, having 3 carbon atoms in oxyalkylene chain, being either in brick manner or in random order, is preferably introduced to be in brick manner, such as: oxyalkylene chain comprising oxyalkylene group having more than 3 carbon atoms—oxyalkylene chain comprising oxyalkylene group having 2 carbon atoms—oxyalkylene chain comprising oxyalkylene group having more than 3 carbon atoms.

Oxyalkylene group having 3 to 8 carbon atoms is desirable as the oxyalkylene group having more than 3 carbon atoms, from a viewpoint of easy introduction or affinity with cement particles. Oxypropylene group having 3 carbon atoms or oxybutylene group having 4 carbon atoms is especially preferable among the oxyalkylene groups.

When a polymeric chain transfer agent in the above mentioned formula (10), formula (11), or formula (12) is used, radicals generated by the other radical polymerization initiator is chain-transferred to thiol groups or allyl groups, then a polymer is formed by continuous addition of monomers to both ends of polyalkylene glycol chain (1) comprising oxyalkylene groups. In this case, a polymer is mainly generated, which has a constituent unit having carboxyl groups derived from monomer (A) at both ends of polyalkylene glycol chain (1) having p, q or r number of oxyalkylene groups, further has a constituent unit having polyalkylene glycol chain (2) having n number of oxyalkylene groups derived from monomer (B) in the case of using monomer (B), and more further has a constituent unit derived from monomer (C) in the case of using monomer (C). In addition to that, a polymer having two or more times repeats of the polymer structure, or a polymer is by-produced, which has a constituent unit having carboxyl groups derived from monomer (A) at both ends of polyalkylene glycol chain (1) having m number of oxyalkylene groups, further has a constituent unit having polyalkylene glycol chain (2) having n number of oxyalkylene groups derived from monomer (B) in the case of using monomer (B), and more further has a constituent unit derived from monomer (C) in the case of using monomer (C).

By using the species of the above novel polymer, in the case of polymerization reaction using a polymeric chain transfer agent in the above mentioned formula (10), formula (11), or formula (12), when monomer (A) is used alone, or monomer (A) and monomer (C) are used in combination, polymer (1), polymer (3) and a polymer obtained by polymerization of monomer (A), or a polymer obtained by polymerization of monomer (A) and monomer (C), are generated as polymer mixture (III). Further, when monomer (A) and monomer (B), or monomer (A), monomer (B) and monomer (C) are used, polymer (2), polymer (4), and a polymer obtained by polymerization of monomer (A) and monomer (B), or a polymer obtained by polymerization of monomer (A), monomer (B), and monomer (C), are generated as polymer mixture (IV).

The relationship between the blending quantity of the polymeric chain transfer agent in the above formula (10), formula (11) or formula (12), and that of monomer (A), monomer (B), and monomer (C), in ratio (by mass %) of polymeric chain transfer agent/(monomer (A)+monomer (B)+monomer (C)), in the case of monomer (A) being the main component, preferably 40/60 to 99/1, more preferably 45/55 to 97/3, further preferably 50/50 to 95/5, especially preferably 55/45 to 92.5/7.5, as well as, in the case of monomer (B) being the main component, preferably 2/98 to 95/5, more preferably 4/96 to 90/10, even more preferably 8/92 to 80/20, further preferably 10/95 to 75/25, more further preferably 15/85 to 70/30, moreover preferably 17.5/82.5 to 65/35, and especially preferably 20/80 to 60/40.

Alternatively, a polymeric azo reaction initiator having a repeating unit in the above formula (7) and a polymeric chain transfer agent in the above formula (10), formula (11), or formula (12) can be used at the same time. In this case, a polymer which has a constituent unit having carboxyl groups derived from monomer (A) at both ends of polyalkylene glycol chain (1) having m number of oxyalkylene groups, further has a constituent unit having polyalkylene glycol chain (2) having n number of oxyalkylene groups derived from monomer (B) in the case of using monomer (B), and more further has a constituent unit derived from monomer (C) in the case of using monomer (C), and/or a polymer which has a constituent unit having carboxyl groups derived from monomer (A) at both ends of polyalkylene glycol chain (1) having p, q or r number of oxyalkylene group, further has a constituent unit having polyalkylene glycol chain (2) having n number of oxyalkylene groups derived from monomer (B) in the case of using monomer (B), and more further has a constituent unit derived from monomer (C) in the case of using monomer (C), are generated.

In addition to that, a polymer which has two or more times repeats of the polymer structure, or a polymer which has a constituent unit having carboxyl groups derived from monomer (A) at both ends of polyalkylene glycol chain (1) having m number of oxyalkylene groups, further has a constituent unit having polyalkylene glycol chain (2) having n number of oxyalkylene groups derived from monomer (B) in the case of using monomer (B), and more further has a constituent unit derived from monomer (C) in the case of using monomer (C), are by-produced.

By using the above novel polymer species, in the case of polymerization reaction using a polymeric azo reaction initiator and a polymeric chain transfer agent in the above formula (10), formula (11), or formula (12), when monomer (A) is used alone, or monomer (A) and monomer (C) are used in combination, polymer (1), polymer (3), and polymer (5), and a polymer obtained by polymerization of monomer (A) at the same time, or a polymer obtained by polymerization of monomer (A) and monomer (C), are generated as polymer mixture (V). Further, when monomer (A) and monomer (B), or monomer (A), monomer (B), and monomer (C) are used, polymer (2), polymer (4), and polymer (6), and a polymer obtained by polymerization of monomer (A) and monomer (B), or a polymer obtained by polymerization of monomer (A), monomer (B), and monomer (C), are generated as polymer mixture (VI).

Alternatively, polyalkylene glycol chain (1) of the novel polymer in this invention is introduced by using a polymeric azo reaction initiator expressed by, for instance, formula (13) as shown below,

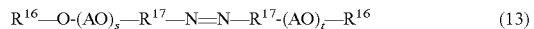

$$R^{16}-O-(AO)_s-R^{17}-N=N-R^{17}-(AO)_t-R^{16} \quad (13)$$

[In the above formula, $R^{16}$ is independent to each other, hydrogen tom or hydrocarbon group having 1 to 20 carbon atoms, $R^{17}$ is independent to each other, organic group, AO is independent to each other, mixture of one or more kinds of oxyalkylene groups having 2 to 18 carbon atoms (here, more than 2 kinds of oxyalkylene groups may be introduced in brick manner or in random order), and s and t are independent to each other, indicate a mean molecular number of added oxyalkylene group and is integral number of 10 to 500.]; a polymeric chain transfer agent expressed by, for instance, formula (14) as shown below, or

$$R^{18}-O-(AO)_u-R^{19}-SH \quad (14)$$

[In the above formula, $R^{18}$ is hydrogen atom, linear chained or branched chained hydrocarbon group having 1 to 20 carbon atoms, phenyl group, alkylphenyl group, pyridinyl group, aromatic group such as thiophene, pyrrole, furan, thiazole, or linear chained or branched chained alkoxy group having 1 to 20 carbon atoms (wherein $R^{18}$ may be partially substituted by hydroxyl group, amino group, cyano group, carbonyl group, carboxyl group, halogen group, sulfonyl group, nitro group or formyl group), $R^{19}$ is organic group, preferably linear chained or branched chained alkylene group having 1 to 18 carbon atoms, phenyl group, alkylphenyl group, pyridinyl group, aromatic group such as thiophene, pyrrole, furan, thiazole, or mercapto carboxylic acid group (wherein $R^{19}$ may be partially substituted by hydroxyl group, amino group, cyano group, carbonyl group, carboxyl group, halogen group, sulfonyl group, nitro group or formyl group), AO is independent to each other, mixture of one or more kinds of oxyalkylene groups having 2 to 18 carbon atoms (here, more than 2 kinds of oxyalkylene group may be introduced in brick manner or in random order), and u indicates a mean molecular number of added oxyalkylene group and is integral number of 10 to 500.], or a polymeric chain transfer agent expressed by, for instance, formula (15) as shown below.

$$R^{20}\text{—}O\text{-}(AO)_v\text{-}CO\text{—}R^{21}\text{—}SH \qquad (15)$$

[In the above formula, $R^{20}$ is hydrogen atom, linear chained or branched chained hydrocarbon group having 1 to 20 carbon atoms, phenyl group, alkylphenyl group, pyridinyl group, aromatic group such as thiophene, pyrrole, furan, thiazole, or linear chained or branched chained alkoxy group having 1 to 20 carbon atoms (wherein $R^{20}$ may be partially substituted by hydroxyl group, amino group, cyano group, carbonyl group, carboxyl group, halogen group, sulfonyl group, nitro group or formyl group), $R^{21}$ is organic group, preferably linear chained or branched chained alkylene group having 1 to 18 carbon atoms, phenyl group, alkylphenyl group, pyridinyl group, aromatic group such as thiophene, pyrrole, furan, thiazole, or mercapto carboxylic acid group (wherein $R^{21}$ may be partially substituted by hydroxyl group, amino group, cyano group, carbonyl group, carboxyl group, halogen group, sulfonyl group, nitro group or formyl group), AO is independent to each other, mixture of one or more kinds of oxyalkylene group having 2 to 18 carbon atoms (here, more than 2 kinds of oxyalkylene group may be introduced in brick manner or in random order), v indicates a mean molecular number of added oxyalkylene group and is integral number of 10 to 500.]

As a polymeric azo reaction initiator in the above formula (13), preferably below formula (16), and

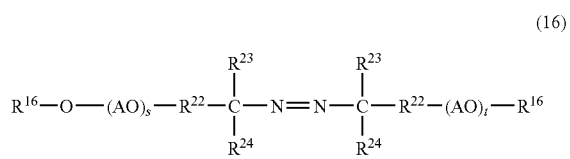

(16)

[In the above formula, $R^{16}$ is independent to each other, hydrogen atom or hydrocarbon having 1 to 20 carbon atoms, $R^{22}$ is independent to each other, alkylene group having 1 to 20 carbon atoms (the alkylene group may be substituted by alkyl group, alkenyl group, hydroxide group, cyano group, carboxyl group or amino group), carbonyl group or carboxyl group, or group wherein alkylene group having 1 to 20 carbon atoms (the alkylene group may be substituted by alkyl group, alkenyl group, hydroxide group, cyano group, carboxyl group or amino group) bonded to carbonyl group or carboxyl group, $R^{23}$ is independent to each other, alkyl group having 1 to 20 carbon atoms, carboxy substituted alkyl group having 1 to 10 carbon atoms], phenyl group or substituted phenyl group, $R^{24}$ is independent to each other, cyano group, acetoxy group, carbamoyl group or (alkoxy)carbonyl group (having 1 to 10 carbon atoms), AO is independent to each other, mixture of one or more kinds of oxyalkylene groups having 2 to 18 carbon atoms (here, more than 2 kinds of oxyalkylene groups may be introduced in brick manner or in random order), and s and t indicates a mean molecular number of added oxyalkylene groups and is integral number of 10 to 500.], and more preferably below formula (17) is applicable.

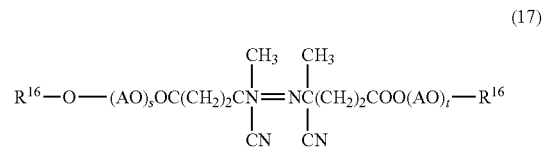

(17)

[In the above formula, $R^{16}$ is independent to each other, hydrogen atom or hydrocarbon having 1 to 20 carbon atoms, AO is independent to each other, mixture of one or more kinds of oxyalkylene groups having 2 to 18 carbon atoms (here, more than 2 kinds of oxyalkylene group may be introduced in brick manner or in random order), and s and t indicates an average molar number of addition of oxyalkylene group and is integral number of 10 to 500.]

A polymeric azo reaction initiator in the above formula (13) is prepared by esterification between, for instance, an azo initiator having carboxyl groups at both ends of azo group (for instance, V-501 etc., Wako Pure Chemical Industries, Ltd.) and alkoxy polyalkylene glycol. In that, production method without heating procedure is needed in the esterification method for preventing dissolution of azo initiator. As such a production method, (1) one of obtaining polymeric azo reaction initiator, wherein after synthesis of acid chloride through a reaction between an azo initiator and a thionyl chloride, alkoxy polyalkylene glycol is reacted; or (2) one of obtaining polymeric azo reaction initiator by dehydrating condensation of the azo initiator and alkoxy polyalkylene glycol by using dicyclohexyl carbodiimide (DCC) and, as occasion demands, 4-dimethyl amino pyridine; are applicable.

As a concrete example of a polymeric chain transfer agent in the above formula (14), for instance, a compound wherein —OH group is substituted by —SH group by reaction of thiocarboxylic acid such as thioacetic acid or thiobenzoic acid to —OH group at both ends of polyalkylene glycol using halogenated zinc and alkali hydrolysis; a compound wherein, in the presence of polyalkylene glycol and thioacetate, after a reaction between azo dicarboxylic acid diethyl (DEAD) and triphenyl phosphyne, by alkali hydrolysis, —OH group in terminal of alkoxypolyalkylene glycol is substituted by —SH group; or a compound wherein allyl group in terminal of alkoxypolyalkylene glycol having double bond is substituted by —SH group by alkali hydrolysis after addition of thiocarboxylic acid such as thioacetate or thiobenzoic acid; are able to be used.

As a concrete example of a polymeric chain transfer agent in the above formula (15), for instance, a compound wherein mercapto carbonic acid such as mercapto acetic acid, mercapto propyonic acid, mercapto benzoic acid, cystein, mercapto nicotinate, mercapto thiazole acetic acid are esterificated to —OH group at both ends of polyalkylene glycol; is able to be used.

In the above formula (15), a linear chained or branched chained alkylene group having 2 to 18 carbon atoms is preferable as mercapto carboxylic acid group described as $R^{21}$, from a viewpoint of hydrolysis resistance.

In the above formula (13), formula (14), and formula (15), a mean molecular number of added oxyalkylene group indicated as s, t, u, or v is preferably more than 10 mole, more preferably more than 20 mole, further preferably more than 30 mole, and especially preferably more than 40 mole, as well as, and preferably less than 500 mol, more preferably less than 400 mol, further preferably less than 350 mol, and especially preferably less than 300 mol.

In the above formula (13), formula (14), and formula (15), the part described as $-(AO)_{s}$-, $-(AO)_{t}$-, $-(AO)_{u}$- or $-(AO)_{v}$- corresponds to polyalkylene glycol chain (1). Oxyalkylene group described as AO needs to have enhanced hydrophilicity from a viewpoint of effectively dispersing cement particles when added to cement admixture, and is preferable to be oxyalkylene group having 2 carbon atoms. The ratio of oxyalkylene groups having 2 carbon atoms in oxyalkylene chain having n numbers of oxyalkylene groups is preferably more than 50 mol %, more preferably more than 60 mol %, further preferably more than 70 mol %, and especially preferably more than 80 mol %.

Further, in the case of preparation of a concrete composition by adding to cement admixture, from a viewpoint of reducing viscosity or stiffing of the concrete, in order to make some structure (network) among cement particles by introduction of oxyalkylene groups having more than 3 carbon atoms into oxyalkylene chain in order to make the chain be, to some extent, hydrophobic. However too much introduction of oxyalkylene groups having more than 3 carbon atoms might cause reduction of cement particle dispersibility because of the enhancement of the hydrophobicity of the prepared polymer. Therefore, the ratio of oxyalkylene groups having more than 3 carbon atoms in oxyalkylene chain is preferably more than 1 mol %, more preferably more than 3 mol %, further preferably more than 5 mol %, and especially preferably more than 7 mol %, as well as, preferably less than 50 mol %, more preferably less than 40 mol %, further preferably less than 30 mol %, especially preferably less than 20 mol %. In addition, oxyalkylene groups, having 3 carbon atoms in oxyalkylene chain, being either in brick manner or in random order, is preferably introduced to be in brick manner, such as: oxyalkylene chain comprising oxyalkylene group having more than 3 carbon atoms—oxyalkylene chain comprising oxyalkylene group having 2 carbon atoms—oxyalkylene chain comprising oxyalkylene group having more than 3 carbon atoms.

Oxyalkylene group having 3 to 8 carbon atoms is desirable as the oxyalkylene group having more than 3 carbon atoms, from a viewpoint of easy introduction or affinity with cement particle. Oxypropylene group having 3 carbon atoms or oxybutylene group having 4 carbon atoms are especially desirable for the oxyalkylene group.

When a polymeric reaction initiator expressed by the above formula (13) is used, radicals generated by heat dissolution of azo group, and polymerization reaction are started at the segment. Therefore, a polymer is formed by addition of monomers to one or both ends of polyalkylene oxide having oxyalkylene group. In this case, which has s or t number of oxyalkylene groups having a constituent unit having carboxyl groups derived from monomer (A), further has a constituent unit having polyalkylene glycol chain (2) having n number of oxyalkylene groups derived from monomer (B) in the case of using monomer (B), and more further having a constituent unit derived from monomer (C) in the case of using monomer (C), is generated. Besides that, a polymer having two or more times repeats of the polymer structure, or a polymer, which has a constituent unit having carboxyl groups derived from monomer (A) at both ends of polyalkylene glycol chain (1) having s or t number of oxyalkylene groups, further has a constituent unit having polyalkylene glycol chain (2) having n number of oxyalkylene groups derived from monomer (B) in the case of using monomer (B), and more further has a constituent unit derived from monomer (C) in the case of using monomer (C), are by-produced.

When a polymeric chain transfer agent in the above formula (14) or above formula (15) is used, radicals generated from thiol group by heat, light, or radiation, or, as occasion demands, radicals generated by another polymerization initiator is chain-transferred to thiol groups, then a polymer is formed by continuous addition of monomer to one end of polyalkylene glycol chain (1) having oxyalkylene groups. In this case, a polymer, which has a constituent unit having carboxyl groups derived from monomer (A) at both ends of polyalkylene glycol chain (1) having u or v number of oxyalkylene groups, further has a constituent unit having polyalkylene glycol chain (2) having n number of oxyalkylene groups derived from monomer (B) in the case of using monomer (B), and more further has a constituent unit derived from monomer (C) in the case of using monomer (C), is mainly generated. In addition to that, a polymer, which has polyalkylene glycol chain (1) having u or v number of oxyalkylene groups at one end of said polymer, or a polymer which has a constituent unit having carboxyl group derived from monomer (A), further has a constituent unit having polyalkylene glycol chain (2) comprising n number of oxyalkylene groups derived from monomer (B) in the case of using monomer (B), and more further has a constituent unit derived from monomer (C) in the case of using monomer (C), is by-produced.

By using the above novel polymer species, in the case of a polymeric azo reaction initiator expressed by the above formula (13) is used for the polymerization reaction, when monomer (A) is used alone, or monomer (A) and monomer (C) are used in combination, polymer (5) and polymer (7) are produced as a polymer mixture (VII). Also, when the combination of monomer (A) and monomer (B) is used or the combination of monomer (A) and monomer (B) and monomer (C) is used, polymer (6) and polymer (8) are produced as a polymer mixture (VIII). Further, in the case of a polymeric chain transfer agent expressed by the above formulae (13) or (14) is used for the polymerization reaction, when monomer (A) is used alone, or monomer (A) and monomer (C) is used in combination, polymer (5), polymer (7), and a polymer obtained by polymerization of monomer (A), or a polymer obtained by polymerization of monomer (A) and monomer (C) are produced as polymer mixture (IX). In addition to that, when monomer (A) and monomer (B) are used, or monomer (A), monomer (B) and monomer (C) are used, polymer (6), polymer (8) and a polymer obtained by polymerization of monomer (A) and monomer (B), or a polymer obtained by polymerization of monomer (A), monomer (B) and monomer (C), are produced as polymer mixture (X).

The relationship between the blending quantity of a polymeric azo reaction initiator expressed by above formula (13) and that of monomer (A), monomer (B) and monomer (C) is, in ratio (by mass %) of polymeric azo reaction initiator/ (monomer (A)+monomer (B)+monomer (C)), in the case of monomer (A) being main component, preferably 40/60 to 99/1, more preferably 45/55 to 97/3, further preferably 50/50 to 95/5, especially preferably 55/45 to 92.5/7.5, as well as, in the case of monomer (B) being main component, preferably 2/98 to 95/5, more 4/96 to 90/10, even more preferably 8/92 to 80/20, further preferably 10/95 to 75/25, more further preferably 15/85 to 70/30, furthermore preferably 17.5/82.5 to 65/35, especially preferably 20/80 to 60/40.

The relationship between the blending quantity of a polymeric chain transfer agent expressed by the above formula (14) or formula (15), and that of monomer (A), monomer (B) and monomer (C), in ratio (by mass %) of polymeric chain transfer agent/(monomer (A)+monomer (B)+monomer (C)), in the case of monomer (A) being main component, preferably 40/60 to 99/1, more preferably 45/55 to 97/3, further preferably 50/50 to 95/5, especially preferably 55/45 to 92.5/7.5, as well as, in the case of monomer (B) being main component, preferably 2/98 to 95/5, more preferably 4/96 to 90/10, even more preferably 8/92 to 80/20, further preferably 10/95 to 75/25, more further preferably 15/85 to 70/30, furthermore preferably 17.5/82.5 to 65/35, especially preferably 20/80 to 60/40.

Alternatively, a polymeric azo reaction initiator expressed by the above formula (13) and a polymeric chain transfer agent expressed by the above formula (14) or (15) can be used at the same time. In this case, a polymer, which has a constituent unit having carboxyl groups derived from monomer (A) at one end of polyalkylene glycol chain (1) having s, t, u or v number of oxyalkylene groups, further has a constituent unit having polyalkylene glycol chain (2) having n number of oxyalkylene groups derived from monomer (B) in the case of using monomer (B) and more further has a constituent unit derived from monomer (C) in the case of using monomer (C), is mainly generated. Besides that, a polymer has another polyalkylene glycol chain (1) comprising s, t, u or v number of polyalkylene groups at said end on said polymer, or a polymer, which has a constituent unit having carboxyl groups derived from monomer (A), further has a constituent unit having polyalkylene glycol chain (2) comprising n number of oxyalkylene groups derived from monomer (B) in the case of using monomer (B) and more further has a constituent unit derived from monomer (C) in the case of using monomer (C), is by-produced.

By using the above novel polymer species, in the case of polymerization reaction using a polymeric reaction initiator expressed by the above formula (13) and a polymeric chain transfer agent expressed by the above formula (14) or above formula (15) at the same time, when monomer (A) is used alone, or monomer (A) and monomer (C) are used in combination, polymer (5), polymer (7) and a polymer obtained by polymerization of monomer (A), or a polymer obtained by polymerization of monomer (A) and monomer (C), are generated as polymer mixture (VII). Further, when monomer (A) and monomer (B), or monomer (A), monomer (B) and monomer (C) are used, polymer (6), polymer (8) and a polymer obtained by polymerization of monomer (A) and monomer (B), or a polymer obtained by polymerization of monomer (A), monomer (B) and monomer (C), are generated as polymer mixture (VIII).

In the above polymerization reaction, other than a polymeric azo reaction initiator having a repeating unit of the above formula (7) or that in the above formula (13), an ordinary radical polymerization initiator is able to be used, as well as, even in the case of using a polymeric chain transfer agent expressed by the above formula (10), formula (11), formula (12), formula (14) or formula (15), an ordinary radical polymerization initiator is able to be used. In the case of using a radical polymerization initiator, any of existing radical polymerization initiator is able to be used, especially in the case of using a polymeric chain transfer agent expressed by the above formula (10), formula (11), formula (12), formula (14) or formula (15), an azo initiator, which can easily generate radicals from thiol group, is preferable. Also, in the case of using a polymeric chain transfer agent expressed by the above formula (10), formula (11), formula (12), formula (14) or formula (15), when the blending quantity of a radical polymerization initiator is too little against the amount of monomers for polymerization, the polymerization rate is slow because the concentration of the radicals is too low; on the other hand, when the blending quantity of a radical polymerization initiator is too much, the yield of block polymers is reduced because the concentration of the radicals is too much and the polymerization from monomers excels to that from thiol groups. Therefore, in this case, the blending quantity of a radical initiator against monomers is preferably more than 0.001 mol %, more preferably 0.01 mol %, further preferably more than 0.1 mol % and especially preferably more than 0.2 mol %, as well as, preferably less than 5 mol %, more preferably less than 2 mol %, further preferably less than 1 mol % and especially preferably less than 0.5 mol %.

In the case of polymerization in solution using water as solvent, as a radical polymerization initiator, water-soluble polymerization initiator, for instance, persulfate salt such as ammonium persulfate, sodium persulfate, potassium persulfate; hydrogen peroxide; azoamidine compound such as 2,2'-azobis-2-methyl-propyone amidine chloride, cyclic azoamidine compound such as 2,2'-azobis-2-(2-imidazoline-2-yl) puropane chloride, azo nitrile compound such as 2-carbamoyl azoisobutylonitrile are used. These polymerization initiator are able to be used alone or in combination thereof. The blending quantity of these polymerization initiators is able to be adjusted according to the kinds or amounts of a polymeric azo reaction initiator having a repeating unit expressed by the above formula (7) or a polymeric azo reaction initiator expressed by the above formula (13), and not to be limited, and is, for instance, against the blending quantity of monomers, preferably more than 0.01 mass %, more preferably more than 0.1 mass %, further preferably more than 0.2 mass %, as well as, preferably less than 20 mass %, more preferably less than 10 mass % and further preferably less than 5 mass %.

In this case, alkali metal sulfite such as sodium hydrogen sulfite, Fe(II) salt such as metha-disulfite, sodium phosphate and Mohr's Salt and an enhancer (reductant) such as sodium hydroxymethane sulfite dihydrate, hydroxylamine chlorate, thiourea, L-ascorbic acid or its salt, erythorbic acid or its salt are able to be added at the same time. The enhancer (reductant) is able to be used alone or in combination thereof. Especially, the combination of hydrogen peroxide and an organic reductant is preferable, as an organic reductant, L-ascorbic acid or its salt, L-ascorbic acid ester, erythorbic acid or its salt, erythorbic acid ester is preferable. The blending quantity of enhancer (reluctant) is not limited and the concentration, for instance, against monomer of use, is preferably more than 0.01 mass %, more preferably more than 0.1 mass % and further preferably more than 0.2 mass %, as well as, preferably less than 20 mass %, more preferably less than 10 mass %, and more preferably less than 5 mass %.

Also, in the case of polymerization in solution using a lower alcohol, aromatic or aliphatic hydrocarbon, ester or ketone as solvent, or, in the case of mass polymerization, a peroxide such as benzoyl peroxide, lauroyl peroxide, sodium peroxide; a hydro peroxide such as t-butylhydro peroxide, cumene hydro peroxide; an azo compound such as azobis isobutylonitryl; can be used as a radical polymerization initiator. These polymerization initiator are able to be used alone or in combination thereof. The blending quantity of these polymerization initiators is able to be adjusted according to the kinds or amounts of a polymeric azo reaction initiator having a repeating unit expressed by the above formula (7) or a polymeric azo reaction initiator expressed by the above formula (13), and not to be limited, and is, for instance, against the blending quantity of monomers, preferably more than 0.01 mass %, more preferably more than 0.1 mass %, further preferably more than 0.2 mass %, as well as, preferably less than 20 mass %, more preferably less than 10 mass % and further preferably less than 5 mass %.

In this case, an enhancer such as amine compound is able to be added. Further, in the case of using mixture of a solvent having water and a lower alcohol, they are selected from the above radical polymerization initiators, or a combination of the above radical polymerization initiators and enhancers. The blending quantity of an enhancer is not to be limited, and is, for instance, against the blending quantity of monomers, preferably more than 0.01 mass %, more preferably more than 0.1 mass %, further preferably more than 0.2 mass %, as well as, preferably less than 20 mass %, more preferably less than 10 mass % and further preferably less than 5 mass %.

In the above polymerization reaction, other than a polymeric chain transfer agent expressed by the above formula (10), formula (11), formula (12), formula (14) or formula (15), an ordinary polymer chain transfer agent is able to be used, as well as, in the case of using a polymeric azo reaction initiator having a repeating unit expressed by the above formula (7) or formula (13), an ordinary polymeric chain transfer agent is able to be used.

As a chain transfer agent, publicly known hydrophilic chain transfer agents can be used; for instance, thiol chain transfer agent such as mercapto ethanol, thio glycerol, thio glycol acid, 3-mercapto propyonic acid, thio malic acid, 2-mercapto ethane sulfonic acid; secondary alcohol such as isopropyl alcohol; lower oxide or its salt such as phosphite, hypophosphorous acid or its salt (sodium phosphinate, potassium phosphinate), sulfite, hydrogensulfite, hydrosulfite, metabisulfite or its salt (sodium sulfite, sodium hydro sulfite, sodium hydrosulfite, sodium metabisulfite).

Also, as a chain transfer agent, a hydrophobic chain transfer agent can be used. As a hydrophobic chain transfer agent, it is preferable to use a thiol chain transfer agent having a hydrocarbon group having more than 3 carbon atoms, such as butanethiol, octanethiol, decanethiol, dodecanethiol, hexadecanethiol, octadecanethiol, cyclohexyl mercaptane, thiophenol, octyl thioglycolate and 3-mercaptopropionic acid octyl.

These chain transfer agents are able to be used alone or in combination thereof, further, for instance, a hydrophilic chain transfer agent and a hydrophobic chain transfer agent can be used at the same time.

The blending quantity of a chain transfer agent can be adjusted according to the kind or amount of the chain transfer agent expressed by the above formula (10), formula (11), formula (12), formula (14) or formula (15) and not to be limited, and is, for instance, against the total molecular number of the monomer components, preferably more than 0.1 mol %, more preferably more than 0.25 mol %, further preferably more than 0.5 mol %, as well as, preferably less than 20 mol %, more preferably less than 15 mol % and further preferably less than 10 mol %.

The above polymerization reaction is able to be carried out by solution polymerization or mass polymerization. Further, the solution polymerization is able to be carried out in batch or continuous procedure.

A solvent used for the solution polymerization is not limited and, for instance, water; alcohol such as methyl alcohol, ethyl alcohol, isopropyl alcohol; aromatic or aliphatic hydrocarbon such as benzene, toluene, xylene, cyclohexane, n-hexane; ester such as ethyl acetate; ketone such as acetone, methylethylketone; cycloether such as tetrahydrofuran, dioxane; are able to be used.

In the above polymerization reaction, temperature is able to be adjusted according to the kind of used solvent or polymerization initiator and not limited, and is preferably more than 0° C., more preferably more than 30° C., and further preferably more than 50° C., as well as, preferably less than 150° C., more preferably less than 120° C., further preferably less than 100° C.

The way of charging each monomer to the reaction vessel is not limited, and the way of charging the total volume to reaction vessel at once in the early stage, the way of charging total volume by division or continuously to the reaction vessel, the way of charging a part of the total volume to the reaction vessel in the early stage and the rest of the volume charged by division or continuously to the reaction vessel, are able to be practiced. The radical polymerization initiator or chain transfer agent is able to be charged to the reaction vessel first, and be delivered into the reaction vessel, or be carried out in combination thereof.

In the above polymerization reaction, for preparing a polymer of aimed molecular weight with reproducibility, it is required that the polymerization reaction stably proceeds. Therefore, in the case of solution polymerization, the concentration of the dissolved oxygen in used solvent at 25° C. is preferably less than 5 ppm, more preferably more than 0.01 ppm and less than 4 ppm, further preferably more than 0.01 ppm and less than 2 ppm, and most preferably more than 0.01 ppm and less than 1 ppm. In the case of conducting, for instance, replacement by nitrogen after adding monomers to the solvent, the concentration of the dissolved oxygen of the system including the monomers is to be defined as the above concentration.

The adjustment of the concentration of the dissolved oxygen of the above solvent is able to be carried out in the polymerization reaction vessel or by using pre-adjusted solvent, and as the way of eliminating oxygen in the solvent, for instance, the following (1) to (5) are able to be used.

(1) After filling an inactive gas such as nitrogen solvent in increased pressure to a closed vessel, the partial pressure of oxygen is reduced by reducing the total pressure in the closed vessel. Also, the pressure reduction in nitrogen flow in the closed vessel is able to be applicable.

(2) Intensively agitating the liquid phase in the vessel for a long time, maintaining the replacement of gaseous part with an inactive gas such as nitrogen.

(3) Bubbling the solvent in the vessel with an inactive gas such as nitrogen for a long time.

(4) Cooling the solvent in atmosphere of an inactive gas such as nitrogen once after boiling.

(5) Adding an inactive gas such as nitrogen into the pipe line, wherein the solvent is supplied through which to the polymerization reaction vessel, by a settled static mixer in middle of the pipe line.

Regarding a polymer prepared by the above polymerization reaction, from a viewpoint of handling, the value of pH of the polymer in solution is to be adjusted preferably more than that of weak acidity, more preferably more than pH4, more preferably more than pH5, especially preferably more than pH6. On the other hand, if the polymerization reaction is carried out in the condition of more than pH7, the polymerization efficiency and the dispersibility are to be reduced. Therefore, the polymerization reaction is preferable to be carried out in from acid to neutral pH range (more preferably less than pH6, further preferably less than pH5.5, and most preferably less than pH5). As preferable polymerization initiator by which the value of pH of the polymerization system becomes less than 7.0, the combination selected from persulfate such as ammonium persulfate, sodium persulfate and potassium persulfate; water-soluble azo initiator such as azoamidine compound such as azobis-2-methyl propyone amidine chloride, hydrogen peroxide, hydrogen peroxide; or organic reductant is able to be listed. Therefore, after conducting the polymerization reaction in low pH, it is preferable to adjust the value of pH to be higher by adding an alkali compound or so. Concretely, the way to adjust the value of pH to be more than 6 by adding an alkali compound after conducting a copolymerization reaction in less than pH6; the way to adjust the value of pH to be more than 5 by adding an alkali compound after conducting a copolymerization reaction in less than pH5; or the way to adjust the value of pH to be more than 6 by adding an alkali compound after conducting a copolymerization reaction in less than pH5 is able to be listed. Adjusting pH is able to be carried out by using an alkali compound such as, for instance, inorganic salt such as hydroxide or carboxylate of monovalent metal or divalent metal; ammonia; and organic amine. Further, in the case of lowering pH, especially pH adjusting is required in polymerization, an acidic compound such as phosphate, sulfate, nitrate, alkylphosphate, alkylsulfate, alkylsulfonic acid, (alkyl) benzen sulfonic acid are able to be used; among these acidic compounds, phosphate, because of having a pH buffering ability, or sulfate, because of having a strong pH lowering ability. Also, after the reaction, concentration adjusting is able to be carried out, as occasion demands.

A polymer mixture prepared by the above polymerization reaction is able to be applied to, as occasion demands, an isolation procedure into each polymer; however, from a viewpoint of production efficiency or cost, normally it is added to a cement admixture without the isolation.

<Cement Admixture>

A cement admixture in this invention includes at least one selected from the group consisting of the above polymer (1) to (8) and the above polymer mixture (I) to (VIII) (hereinafter referred to as "polymer component").

The blending quantity of the polymer components added to a cement admixture is able to be adjusted according to aimed dispersibility and not limited, and is preferably, concretely, in solid conversion, more than 50 mass %, more preferably more than 60 mass %, even more preferably more than 70 mass % and further preferably more than 80 mass % against the total mass of the cement admixture.

As occasion demands, besides the polymer components, a polycarboxylic acid polymer is able to be added to the cement admixture in this invention. In the case, the blending quantity of adding is, in ratio (by mass %) of polymer component/polycarboxylic acid polymer, preferably 90/10 to 10/90, more preferably 80/20 to 20/80, further preferably 70/30 to 30/70, especially preferably 60/40 to 40/60.

Also, as occasion demands, antifoaming agent [(poly)oxyethylene(poly)oxyprolylene additive or diethyleneglycol heptyl ether] or polyalkylene imine alkylene oxide additive such as polyalkylene imine (ethyleneimine or propyleneimine) are able to be added to a cement admixture in this invention.

As antifoaming agent to be used, concretely, polyoxy alkylene such as (poly)oxyethylene(poly)oxypropylene adduct; polyoxy alkylene alkyl ether such as diethylene glycol heptyl ether, polyoxy ethylene oleyl ether, polyoxy propylene butyl ether, polyoxy ethylene polyoxy propylene 2-ethylhexyl ether, oxyethylene oxypropylene additive of higher alcohol having 12 to 14 carbon atoms; polyoxy alkylene (alkyl) allyl ether such as, polyoxy propylene phenyl ether, polyoxy ethylene nonyl phenyl ether; acetylene ether prepared by addition polymerization of alkylene oxide to acetylene alcohol such as 2,4,7,9-tetramethyl 5-decin-4,7-diol, 2,5-dimethyl-3-hexyne-2,5-diol, 3-methyl-1-butyne-3-ol; (poly)oxyalkylene fatty acid ester such as diethyleneglycol oleic acid ester, diethylene glycol lauryl acid ester, ethylene glycol distealyc acid ester; polyoxy alkylene sorbitan fatty acid ester such as polyoxy ethylene sorbitan monolauric acid ester, polyoxy ethylene sorbitan trioleic acid ester; polyoxy alkylene alkyl (allyl) ether sulfate ester salt such as polyoxy propylene methyl ether sodium sulfate, polyoxyethylene dodecyl phenyl ether sodium sulfate; polyoxy alkylene alkyl phosphate ester such as polyoxy ethylene stearyl phosphate ester; polyoxy alkylene alkyl amine such as polyoxy propylene polyoxy ethylene lauryl amine (1 to 20 mol added propylene oxide or 1 to 20 mol added ethyleneoxide), alkylene oxide added harden tallow amine (1 to 20 mol added propyleneoxide or 1 to 20 mol added ethyleneoxide adduct); or polyoxy alkylene amide; are able to be used. These antifoaming agents are able to be used alone or in combination. The timing of adding the antifoaming agent may be either before, during or after the polymerization. Further, the blending quantity of the antifoaming agent is preferably more than 0.0001 mass % and more preferably more than 0.001 mass %, as well as, preferably less than 20 mass % and more preferably less than 10 mass % against the total mass of the polymer components. If the blending quantity of the antifoaming agent is less than 0.0001 mass %, antifoaming effect is occasionally not exhibited enough. On the other hand, if the blending quantity of the antifoaming agent is more than 20 mass %, the antifoaming effect is practically saturated; in addition to that, the production cost increases because the blending quantity of the antifoaming agent not necessarily increases.

A cement admixture in this invention is able to be used together with one or more publicly known cement admixtures. As publicly known cement admixtures for joint use, publicly known polycarboxylic acid admixtures and sulfonic acid admixtures having a sulfonic acid group in the molecular thereof are preferable. By jointly using with these publicly known cement admixtures, a cement admixture of this invention, exhibiting stable dispersibility, which is able to be prepared regardless of its cement brand or production lot.

A sulfonic acid admixture is an admixture, having dispersibility by electrostatic repulsion against cement particles mainly derived from sulfonic acid group, and publicly known sulfonic acid admixtures are used for it, preferably are compounds having aromatic group(s) in the molecular. Concretely, various kinds of sulfonic acid admixtures, for instance, polyalkyl allyl sulfonic acid salts such as naphthalene sulfonic acid formaldehyde condensate, methylnaphthalene sulfonic acid formaldehyde condensate, anthracene sulfonic acid formaldehyde condensate; melamine formalin resin sulfonates such as melamine sulfonic acid formaldehyde condensate; aromatic amino sulfonates such as aminoallyl sulfonic acid-phenol formaldehyde condensate; lignin sulfonates such as lignin sulfonate, denatured lignin sulfonate; polystylene sulfonates are able to be listed. In the case of a concrete wherein water/cement ratio is high, lignin sulfonate admixtures are preferably used, on the other hand, in the case of a concrete wherein water/cement ratio is medium so that higher dispersibility is needed, admixtures such as polyalkyl allyl sulfonate, melamine formalin resin sulfonates, aromatic amino sulfonates, polystylene sulfonates are preferably used. Sulfonic acid admixtures having sulfonic acid group in the molecular are able to be used alone or in combination.

Besides the above sulfonate admixtures, oxycarboxylic acid compounds are jointly used with a cement admixture in this invention. By adding an oxycarboxylic acid compound, even at a high temperature, higher dispersibility is exhibited.

As oxycarboxylic acid compounds, oxycarboxylic acid having 4 to 10 carbon atoms or its salt, concretely, for instance, gluconic acid, glucoheptone acid, alabonic acid, malic acid, citric acid, or these inorganic salts or organic salts with sodium, potassium, calcium, magnesium, ammonium, triethanol amine, are preferable. These oxycarboxylic acid compounds are able to be used alone or in combination. In these oxycarboxylic acid compounds, gluconic acid or its salt are especially preferable. Especially, in the case of poor mixed concrete, using lignin sulfonate admixtures as sulfonic acid admixtures having sulfonic acid group in the molecular and gluconic acid or its salt as oxycarboxylic acid compounds is preferable.

In the case of jointly using a cement admixture in this invention and a sulfonic acid admixture, the mixing ratio (cement admixture in this invention/sulfonic acid admixture, in solid conversion: by mass %) is preferably 1 to 99/99 to 1, more preferably 5 to 95/95 to 5, further preferably 10 to 90/90 to 10, especially preferably 20 to 80/80 to 20. Also, in the case of jointly using a cement admixture in this invention and an oxycarboxylic acid compound, the mixing ratio of the cement admixture in this invention and the oxycarboxylic acid compound (cement admixture in this invention/oxycarboxylic acid compound, in solid conversion: by mass %) is preferably 1 to 99/99 to 1, more preferably 5 to 95/95 to 5, further preferably 10 to 90/90 to 10, especially preferably 20 to 80/80 to 20.

Further, in the case of jointly using three components of a cement admixture in this invention, a sulfonic acid admixture having sulfonic acid group in the molecular and an oxycarboxylic acid compound, the mixing ratio of the cement admixture in this invention, sulfonic acid admixture having sulfonic acid group in the molecular and oxycarboxylic acid compound (cement admixture in this invention/sulfonic acid admixture having sulfonic acid group in the molecular/oxycarboxylic acid compound: by mass %) is preferably 1 to 98/1 to 98/1 to 98, more preferably 5 to 90/5 to 90/5 to 90, further preferably 10 to 90/5 to 85/5 to 85, especially preferably 20 to 80/10 to 70/10 to 70.

Further, a cement admixture in this invention is able to be, as occasion demands, jointly used with publicly known cement admixture as shown (1) to (11) below.

(1) Water-soluble polymer: unsaturated carboxylic acid polymer such as polyacrylic acid (sodium), polymethacrylic acid (sodium), polymaleic acid (sodium), copolymer of acrylic acid maleic acid sodium salt; nonionic cellulose ether such as methyl cellulose, ethyl cellulose, hydroxy methyl cellulose, hydroxy ethyl cellulose, carboxy methyl cellulose, carboxy ethyl cellulose, hydroxy propyl cellulose; polysaccharide derivative, wherein a part or whole of hydrogen atom in hydroxygroup of alkyl- or hydroxyalkyl-derivative of polysaccharide such as methyl cellulose, ethyl cellulose, hydroxy ethyl cellulose or hydroxy propyl cellulose, are substituted by hydrophobic substitution group having hydrocarbon chain having 8 to 40 carbon atoms as its part and ionic hydrophilic substitution group having sulfonic acid group or its salt as its part; polysaccharide, produced by microbial fermentation, such as yeast glucan, xanthan gum, beta-1,3 glucan (linear chain or branched chain, for instance, curdlan, paramylon, pachyman, scleroglucan, laminaran); polyacrylamid; polyvinyl alcohol; starch; starch phosphate ester; sodium alginate; gelatin; acrylic acid copolymer having amino group in the molecular or its quaternary compounds.

(2) Polymer emulsion: copolymer of vinyl monomers such as (meth)acrylic acid alkyl.

(3) Curing retardant other than oxycarboxylic acid compounds: monosaccharide such as glucose, fructose, galactose, saccharose, xylose, apiose, ribose, monosaccharide such as glucose-isomerase, or oligosaccharide such as disaccharide and trisaccharide, oligosaccharide such as dextrin, or polysaccharide such as dextran, saccharide containing these compound such as molasses; sugar alcohol such as sorbitol; magnesium fluorosilicate; phosphate or its salt or borate ester; aminocarboxylic acid or its salt; alkali-soluble protein; humic acid; tannic acid; phenol; polyhydric alcohol such as glycerin; phosphonic acid or its derivative such as amino tri(methylene sulfonate), 1-hydroxyethylidene-1,1-diphosphonic acid, ethylene diamine tetra(methylene phosphonic acid), diethylene triamine penta(methylene phosphonic acid) and these alkali metal salt, alkali earth metal salt.

(4) Accelerator: water-soluble calcium salt such as calcium chloride, calcium nitrite, calcium nitrate, calcium bromide, calcium iodide; chloride such as ferric chloride, magnesium chloride; sulfate; potassium hydroxide; sodium hydroxide; carboxylate; thiosulfate; formate such as formic acid or calcium formate; alkanol amine; almina cement; calcium alminate silicate.

(5) Antifoaming agents other than oxyalkylenes: mineral oil antifoaming agents such as kerosene, liquid paraffin; oil antifoaming agents such as animal or vegetable oil, sesame oil, castol oil, these alkyleneoxide additives; fatty acid antifoaming agents such as oleic acid, stearic acid, or these alkyleneoxide additives; fatty acid ester antifoaming agents such as glycerin monoricinolate, alkenil succinic acid derivative, sorbitol monolaurate, sorbitol trioleate, wax; alcohol antifoaming agents such as octyl alcohol, hexadecil alcohol, acetylenealcohol, glycol; amid antifoaming agents such as acrylate polyamine; phosphate ester antifoaming agents such as tributyl phosphate, sodium octyl phosphate; metal soap antifoaming agents such as aluminium stealate, calcium oleate; silicone antifoaming agents as dimethyl silicone oil, silicone paste, silicone emulsion, organic denatured poly siloxane (poly organosiloxane such as dimethyl poly siloxane), fluoro silicone oil.

(6) AE reagent: resin soap, saturated or unsaturated fatty acid, hydroxystearic acid sodium, lauryl sulfate, ABS (alkyl benzene sulfonic acid), LAS (linear chain alkyl benzene sulfonic acid), alkane sulfonate, polyoxy ethylene alkyl(phenyl) ether, polyoxy ethylene alkyl(phenyl) ether sulfate ester or its salt, polyoxy ethylene alkyl(phenyl) ether phosphate ester or its salt, proteinous material, alkenil sulfosuccinate, alpha-olefine sulfonate.

(7) The other surfactants: polyalkylene oxide derivative, wherein more than 10 mol of alkyleneoxide such as ethyleneoxide or propyleneoxide are added to aliphatic monovalent alcohol having 6 to 30 carbon atoms in molecular such as octadecil alcohol or stearyl alcohol, cycloaliphatic monovalent alcohol having 6 to 30 carbon atoms such as abietyl alcohol, monovalent mercaptane having 6 to 30 carbon atoms in molecular such as dodecylmercaptane, alkylphenol having 6 to 30 carbon atoms in molecular such as nonylphenol, amine having 6 to 30 carbon atoms in molecular such as dodecylamine or carboxylic acid having 6 to 30 carbon atoms in molecular such as laurinic acid or stearic acid; alkyl diphenyl ether sulfonate wherein two phenyl group having sulfone group are etherificated and may have alkyl group or alkoxy group as substitution group; anionic surfactants; cationic surfactants such as alkylamine acetate, alkyltrimethyl ammonium chloride; nonionic surfactants; amphoteric surfactant.

(8) Waterproofing agent: fatty acid (salt), fatty acidester, oil, silicone, paraffin, asphalt, and wax or so.

(9) Corrosion inhibitor: nitrite, phosphate salt, zinc oxide or so.

(10) Anti-cracking agent; polyoxyalkyl ether or so.

(11) Inflating agent; ettringites, coals or so.

As the other publicly known cement additives, cement-moisturizing agent, thickening agent, anti-separation agent, flocculating agent, drying-shrinkage-reducing agent, strength-enhancing agent, self-leveling agent, rust-preventing reagent, colorant, anti-mold agent. These publicly known cement additives are used alone or in combination.

In the above cement composition, as especially preferable embodiments of components other than cement and water, the following (1) to (4) are able to be used.

(1) Combination wherein a cement admixture in this invention and an oxyalkylene antifoaming agent are essential. As oxyalkylene antifoaming agents, polyoxyalkylene, polyoxy alkylene alkyl ether, polyoxy alkylene acetylene ether, polyoxy alkylene alkylamine are preferable. In these oxyalkylene antifoaming agents, polyoxy alkylene alkylamine is especially preferable. The blending quantity of oxyalkylene antifoaming agent is, against the total mass of the polymer components contained in a cement admixture in this invention, preferably more than 0.01 mass %, as well as, less than 20 mass %.

(2) Combination wherein a cement admixture in this invention and an anti material separation agent are essential. As anti material separation agent, for instance, viscous agent such as nonionic cellulose ether, compound having hydrophobic substitution group having hydrocarbon chain having 4 to 30 carbon atoms, and polyoxyalkylene chain with a mean addition molecular number of 2 to 300 mole of alkyleneoxide having 2 to 18 carbon atoms as its partial structure. These anti material separation agent are used alone or in combination. The ratio (by mass %) of cement admixture in this invention and anti material separation agent is preferably 10/90 to 99.99/0.01, more preferably 50/50 to 99.9/0.1. A cement composition of this combination is preferable for high flowing concretes, self-compacting concretes and self-leveling agents.

(3) Combination wherein a cement admixture in this invention and an accelerator are essential. As accelerators, for instance, soluble calcium salt such as calcium chloride, calcium nitrite, calcium nitrate; chloride such as ferric chloride, magnesium chloride; thiosulfate; formate such as formic acid or calcium formate are able to be listed. These accelerators are used alone or in combination. The ratio (by mass %) of cement admixture in this invention and accelerator is preferably 10/90 to 99.9/0.1 and more preferably 20/80 to 99/1.

(4) Combination wherein a cement admixture in this invention, an oxyalkylene antifoaming agent and an AE agent are essential. As oxyalkylene antifoaming agents, for instance, polyoxyalkylene, polyoxy alkylene alkyl ether, polyoxy alkylene acetylene ether, polyoxy alkylene alkylamine are preferable. These oxyalkylene antifoaming agents are used alone or in combination. In these oxyalkylene antifoaming agents, polyoxyalkylene alkylamine is especially preferable. The blending quantity of oxyalkylene antifoaming agent is, against the total mass of the polymer components contained in a cement admixture in this invention, preferably more than 0.01 mass %, as well as, less than 20 mass %. On the other hand, the blending quantity of AE agent is, against the total mass of the cement, preferably more than 0.001 mass %, as well as, less than 2 mass %.

Cement admixture in this invention is able to be used as water solution or, after reaction, to be dried after the neutralization with hydroxide of divalent metal such as calcium and magnesium to make multivalent metal salt, to be dried with fixing to inorganic powders such as silica powders, smashed after dry-fixed to inorganic powders in film-like by using a drum-type drier, a disk-type drier or a belt-type drier or to be dry-fixed by using spray drier to make powders. Also, powdered cement admixture in this invention is able to be pre-added to a cement composition without water such as cement powder or dry mortar, and able to be used as premixture for a plasterer, flooring, grout, or able to be mixed at the time of cement composition mixing.

Cement admixture in this invention is able to be used for hydraulic materials, in another word, cement compositions such as cement or gypsum or the other hydraulic materials. As concrete example of hydraulic composition containing such hydraulic material and water and cement admixture in this invention and, as occasion demands, containing fine aggregate (sand) or coarse aggregate (crushed stone), for instance, cement paste, mortar, concrete, or plaster or so.

Among the above hydraulic compositions, cement compositions, using cement as a hydraulic material, are most general, and a cement composition contains a cement admixture in this invention, cement and water, as essential component. Such a cement composition is a preferable embodiment of this invention.

Cement used for a cement composition is not limited, and is preferably, concretely, for instance, portland cement (normal, high-early-strength, super high-early-strength, moderate heat, sulfate-proof, or low alkali type thereof), mixed cement (blast furnace cement, silica cement, fly-ash cement), white portland cement, almina cement, rapid curing cement (1 clinker rapid curing cement, 2 clinker rapid curing cement, phosphate magnesium cement), grout cement, oil well cement, low heat cement (low heat blast furnace cement, fly-ash mixed low heat blast furnace cement, belite enriched cement), super high-strength cement, fixing cement species, eco cement (cement made from more than 1 kind of city dust ash or sludge ash). Further, blast furnace slug, fly-ash, cylinder ash, clinker ash, husk ash, silica-fume, powder such as limestone powder or gypsum are able to be added to a cement composition. Also, as aggregate, other than gravel, crushed stone, water-crushed slug or recycled aggregate, fire-proof aggregate such as silica rock, clay, Zircon, high alumina, silica carbide, graphite, chromium, chrome-magnesia, magnesia are able to be used.

In the above cement composition, regarding the amount of unit water per 1 $m^3$, that of cement usage and the ratio of water/cement (by mass), wherein the amount of unit water is preferably more than 100 $kg/m^3$ and less than 185 $kg/m^3$, and more preferably more than 120 $kg/m^3$ and less than 175 $kg/m^3$; the mount of cement usage is preferably more than 200 $kg/m^3$ and less than 800 $kg/m^3$, and more preferably more than 250 $kg/m^3$ and less than 800 $kg/m^3$; and the ratio of water/cement (by mass) is preferably more than 0.1 and less than 0.7, and more preferably more than 0.2 and less than 0.65, so it is able to be used from poor-mixing to rich-mixing ranges. A cement admixture in this invention is able to be used in highly reduced water ratio range, in another word, in a range of low water/cement ratio, wherein the ratio of water/cement (by mass) is more than 0.15 and less than 0.5 (preferably more than 0.15 and less than 0.4), furthermore, is able to be used for high strength concretes, wherein the unit cement blending quantity is high and water/cement ratio is low, or poor-mixing concretes, wherein the unit cement blending quantity is less than 300 $kg/m^3$.

In the above cement composition, usage of cement admixture in this invention is, for instance, in the case of using for mortar or concrete with hydraulic cement, in solid conversion, against mass of cement, preferably more than 0.01 mass % and less than 10.0 mass %, more preferably more than 0.02 mass % and less than 5.0 mass %, further preferably more than 0.05 mass % and less than 3.0 mass %, especially preferably more than 0.1 mass % and less than 2.0 mass %. By mixing such amount rates, preferable effects such as reduction of unit water, enhancing the strength and enhancing the durability are obtained. However, when the addition rate of a cement admixture in this invention is less than 0.01 mass %, dispersing ability is occasionally not enough. On the other hand, when the addition rate of a cement admixture in this invention is more than 10.0 mass %, dispersing effect is practically saturated; in addition to that, its production cost occasionally increases because the anti foaming agent is used more than needed.

The above cement composition has excellent workability such as enhanced dispersibility and dispersing keeping ability even in highly reduced water ratio range, and enough dispersibility in early stage and stickiness reducing ability even at a low temperature, so it is effective to be used for ready mixed concretes, concretes for secondary concrete products (precast concretes), concretes for centrifuge, concretes for compaction with vibration, steam curing concretes and reinforced concretes. Further, it is effective to be used for mortar or concretes being needed to have high fluidity such as moderate flow concretes (wherein slump value is more than 22 cm and less than 25 cm), high flow concretes (wherein slump value is more than 25 cm, slump-flow value is more than 50 cm and less than 70 cm), self-compacting concretes and self-leveling materials.

EXAMPLE

Hereinafter, the invention will be more concretely described by the following examples, however the invention is not limited to those examples, any proper modifications can be made without departing from the scope of the invention, and all of them fall within the technical scope of the invention.

First, the method of measuring the molecular weights of the polymers prepared by the following Synthetic Examples is described.

<Method of Measuring Molecular Weight>

Molecular weights of the polymers or the competitive polymers prepared by the following Synthetic Examples and comparative Synthetic Examples were measured with the measurement conditions below.

Column: TSK guard column SWXL+TSK gel G4000SWXL+G3000SWXL+G2000SWXL (manufactured by Tosoh corporation)

Eluting solvent: Solution wherein 115.6 g of sodium acetate trihydrate was dissolved in a solution mixture containing 10999 g of water and 6001 g of acetonitrile, and the pH thereof is adjusted to 6.0 using acetic acid.

Apply volume of sample: 100 μL

Flow rate: 0.8 mL/min

Column temperature: 40° C.

Detector: 2414 Differential Refractive Index (DRI) Detector (manufactured by Nippon Waters Co.)

Analysis software: Empower Software (manufactured by Nippon Waters Co.)

Reference material for making calibration curve: polyethylene glycol (peak top MW (Mp): 272,500, 219,300, 107,000, 50,000, 24,000, 12,600, 7,100, 4,250, 1,470)

Calibration curve: Made in third-order formulation based on the above Mp value of polyethylene glycol and elution time.

Samples were prepared by dissolving polymer solutions to the above eluting solvent adjusting the concentration to 0.5 mass %.

Next, the Synthetic Examples 1 to 6 of the novel polymers in this invention, using a polymeric azo reaction initiator, having a repeating unit expressed by the above Formula (9), are described.

Synthetic Example 1

A glass reaction vessel equipped with a thermometer, a stirrer, a dropping device, a nitrogen inlet tube and a reflux condenser (cooling tube) was charged with 100.0 g of water, and the contents were heated to 95° C. in the reaction vessel wherein the air inside was replaced with nitrogen under agitation. Subsequently, 70.1 g of methoxypolyethylene glycol methacrylic acid ester (the mean molecular number of added ethylene oxide was 23) and 9.9 g of methacrylic acid were dissolved to 120.0 g of water to prepare a monomer mixture solution. Also, 20.0 g of polymeric azo reaction initiator (Wako Pure Chemical Industries, Ltd., VPE-0401) was dissolved to 80.0 g of water to prepare a reaction initiator solution. Thereafter these monomer mixture solution and reaction initiator solution were delivered by drops into the reaction vessel at a constant rate over 3 hours. After adding monomer mixture solution and reaction initiation solution were finished, the temperature was maintained at 95° C. for 2 hours to complete polymerization reaction. Accordingly, a solution of polymer (A-1) in this invention being weight-average molecular weight of 52,300 was prepared.

The prepared polymer (A-1) in this invention was a mixture containing polymer (2), wherein carboxyl group derived from methacrylic acid and polyalkylene glycol chain (2) derived from methoxypolyethylene glycol methacrylic acid ester (the mean molecular number of added ethylene oxide was 23) were connected at both ends of polyalkylene glycol chain (1), polymer (4) made from repeats of the constituent unit of polymer (2), and polymer (6) wherein carboxyl group derived from methacrylic acid and polyalkylene glycol chain (2) derived from methoxypolyethylene glycol methacrylic acid ester (the mean molecular number of added ethylene oxide was 23) were connected at one end of polyalkylene glycol chain (1) (the average molar number of addition of ethylene oxide was 90).

Synthetic Example 2

A glass reaction vessel equipped with a thermometer, a stirrer, a dropping device, a nitrogen inlet tube and a reflux condenser (cooling tube) was charged with 100.0 g of water, and the contents were heated to 95° C. in the reaction vessel wherein the air inside was replaced with nitrogen under agitation. Subsequently, 71.8 g of methoxypolyethylene glycol methacrylic acid ester (the mean molecular number of added ethylene oxide was 23) and 8.2 g of methacrylic acid were dissolved to 120.0 g of water to prepare a monomer mixture solution. Also, 20.0 g of polymeric azo reaction initiator (Wako Pure Chemical Industries, Ltd., VPE-0401) was dissolved to 80.0 g of water to prepare a reaction initiator solution were delivered by drops into the reaction vessel at a constant rate over 3 hours. After adding monomer mixture solution and reaction initiator solution were finished, the temperature was maintained at 95° C. for 2 hours to complete polymerization reaction. Accordingly, a solution of polymer (A-2) in this invention being weight-average molecular weight of 51,500 was prepared.

The prepared polymer (A-2) in this invention was a mixture containing polymer (2), wherein carboxyl group derived from methacrylic acid and polyalkylene glycol chain (2) derived from methoxypolyethylene glycol methacrylic acid ester (the mean molecular number of added ethylene oxide was 23) were connected at both ends of polyalkylene glycol chain (1), polymer (4) made from repeats of the constituent unit of polymer (2), and polymer (6) wherein carboxyl group derived from methacrylic acid and polyalkylene glycol chain (2) derived from methoxypolyethylene glycol methacrylic acid ester (the mean molecular number of added ethylene oxide was 23) were connected at one end of polyalkylene glycol chain (1) (the mean molecular number of added ethylene oxide was 90).

Synthetic Example 3

A glass reaction vessel equipped with a thermometer, a stirrer, a dropping device, a nitrogen inlet tube and a reflux condenser (cooling tube) was charged with 100.0 g of water, and the contents were heated to 95° C. in the reaction vessel wherein the air inside was replaced with nitrogen under agitation. Subsequently, 70.1 g of methoxypolyethylene glycol methacrylic acid ester (the mean molecular number of added ethylene oxide was 23) and 9.9 g of methacrylic acid were dissolved to 120.0 g of water to prepare a monomer mixture solution. Also, 20.0 g of polymeric azo reaction initiator (Wako Pure Chemical Industries, Ltd., VPE-0201) was dissolved to 80.0 g of water to prepare a reaction initiator solution. Thereafter these monomer mixture solution and reaction initiator solution were delivered by drops into the reaction vessel at a constant rate over 3 hours. After adding monomer mixture solution and reaction initiator solution were finished, the temperature was maintained at 95° C. for 2 hours to complete polymerization reaction. Accordingly, a solution of polymer in this invention (A-3) being weight-average molecular weight of 43,300 was prepared.

The prepared polymer (A-3) in this invention was a mixture containing polymer (2) wherein carboxyl group derived from methacrylic acid and polyalkylene glycol chain (2) derived from methoxypolyethylene glycol methacrylic acid ester (the mean molecular number of added ethylene oxide was 23) were connected at both ends of polyalkylene glycol chain (1) (the mean molecular number of added ethylene oxide was 45), polymer (4) made from repeats of the constituent unit of polymer (2), and polymer (6) wherein carboxyl group derived from methacrylic acid and polyalkylene glycol chain (2) derived from methoxypolyethylene glycol methacrylic acid ester (the mean molecular number of added ethylene oxide was 23) were connected at one end of polyalkylene glycol chain (1) (the mean molecular number of added ethylene oxide was 45).

Synthetic Example 4

A glass reaction vessel equipped with a thermometer, a stirrer, a dropping device, a nitrogen inlet tube and a reflux condenser (cooling tube) was charged with 100.0 g of water, and the contents were heated to 95° C. in the reaction vessel wherein the air inside was replaced with nitrogen under agitation. Subsequently, 71.8 g of methoxypolyethylene glycol methacrylic acid ester (the mean molecular number of added ethylene oxide was 23) and 8.2 g of methacrylic acid were dissolved to 120.0 g of water to prepare a monomer mixture solution. Also, 20.0 g of polymeric azo reaction initiator (Wako Pure Chemical Industries, Ltd., VPE-0201) was dissolved to 80.0 g of water to prepare a reaction initiator solution. Thereafter these monomer mixture solution and reaction initiation solution were delivered by drops into the reaction vessel at a constant rate over 3 hours. After adding monomer mixture solution and reaction initiation solution were finished, the temperature was maintained at 95° C. for 2 hours to complete polymerization reaction. Accordingly, a solution of polymer in this invention (A-4) being weight-average molecular weight of 42,000 was prepared.

The prepared polymer (A-4) in this invention was a mixture containing polymer (2) wherein carboxyl group derived from methacrylic acid and polyalkylene glycol chain (2) derived from methoxypolyethylene glycol methacrylic acid ester (the mean molecular number of added ethylene oxide was 23) were connected at both ends of polyalkylene glycol chain (1) (the mean molecular number of added ethylene oxide was 45), polymer (4) made from repeat of the polymer (2), and polymer (6) wherein carboxyl group derived from methacrylic acid and polyalkylene glycol chain (2) derived from methoxypolyethylene glycol methacrylic acid ester (the mean molecular number of added ethylene oxide was 23) were connected at one end of polyalkylene glycol chain (1) (the mean molecular number of added ethylene oxide was 45).

Synthetic Example 5

A glass reaction vessel equipped with a thermometer, a stirrer, a dropping device, a nitrogen inlet tube and a reflux condenser (cooling tube) was charged with 100.0 g of water, and the contents were heated to 95° C. in the reaction vessel wherein the air inside was replaced with nitrogen under agitation. Subsequently, 70.1 g of methoxypolyethylene glycol methacrylic acid ester (the mean molecular number of added ethylene oxide was 23) and 9.9 g of methacrylic acid were dissolved to 120.0 g of water to prepare a monomer mixture solution. Also, 20.0 g of polymeric azo reaction initiator (Wako Pure Chemical Industries, Ltd., VPE-0601) was dissolved to 80.0 g of water to prepare a reaction initiator solution. Thereafter these monomer mixture solution and reaction initiator solution were delivered by drops into the reaction vessel at a constant rate over 3 hours. After adding monomer mixture solution and reaction initiator solution were finished, the temperature was maintained at 95° C. for 2 hours to complete polymerization reaction. Accordingly, a solution of polymer in this invention (A-5) being weight-average molecular weight of 91,600 was prepared.

The prepared polymer (A-5) in this invention was a mixture containing polymer (2) wherein carboxyl group derived from methacrylic acid and polyalkylene glycol chain (2) derived from methoxypolyethylene glycol methacrylic acid ester (the mean molecular number of added ethylene oxide was 23) were connected at both ends of polyalkylene glycol chain (1) (the mean molecular number of added ethylene oxide was 135), polymer (4) made from repeats of the constituent unit of polymer (2), and polymer (6) wherein carboxyl group derived from methacrylic acid and polyalkylene glycol chain (2) derived from methoxypolyethylene glycol methacrylic acid ester (the mean molecular number of added ethylene oxide was 23) were connected at one end of polyalkylene glycol chain (1) (the mean molecular number of added ethylene oxide was 135).

Synthetic Example 6

A glass reaction vessel equipped with a thermometer, a stirrer, a dropping device, a nitrogen inlet tube and a reflux condenser (cooling tube) was charged with 100.0 g of water, and the contents were heated to 95° C. in the reaction vessel wherein the air inside was replaced with nitrogen under agitation. Subsequently, 71.8 g of methoxypolyethylene glycol methacrylic acid ester (the mean molecular number of added ethylene oxide was 23) and 8.2 g of methacrylic acid were dissolved to 120.0 g of water to prepare a monomer mixture solution. Also, 20.0 g of polymeric azo reaction initiator (Wako Pure Chemical Industries, Ltd., VPE-0601) was dissolved to 80.0 g of water to prepare a reaction initiator solution. Thereafter these monomer mixture solution and reaction initiation solution were delivered by drops into the reaction vessel at a constant rate over 3 hours. After adding monomer mixture solution and reaction initiation solution were finished, the temperature was maintained at 95° C. for 2 hours to complete polymerization reaction. Accordingly, a solution of polymer in this invention (A-6) being weight-average molecular weight of 85,600 was prepared.

The prepared polymer (A-6) in this invention was a mixture containing polymer (2) wherein carboxyl group derived from methacrylic acid and polyalkylene glycol chain (2) derived from methoxypolyethylene glycol methacrylic acid ester (the a mean molecular number of added ethylene oxide was 23) were connected at both ends of polyalkylene glycol chain (1) (the mean molecular number of added ethylene oxide was 135), polymer (4) made from repeats of the constituent unit of polymer (2), and polymer (6) wherein carboxyl group derived from methacrylic acid and polyalkylene glycol chain (2) derived from methoxypolyethylene glycol methacrylic acid ester (the mean molecular number of added ethylene oxide was 23) were connected at one end of polyalkylene glycol chain (1) (the mean molecular number of added ethylene oxide was 135).

Reference Example 1

In this reference example, a polymeric azo reaction initiator shown in the above Formula (17) used for the following production examples 7 to 10 was prepared.

A glass reaction vessel equipped with a thermometer, a stirrer, a dropping device, a nitrogen inlet tube and a reflux condenser (cooling tube) was charged with 12.5 g (0.045 mol) of 4,4'-azobis (4-cyanopentanic acid (Wako Pure Chemical Industries, Ltd. Azo reaction initiator V-501) and 390.0 g of dichrolomethane; and the inside thereof was conducted a proper nitrogen substitution with agitation at room temperature. Subsequently, a solution prepared by adding 27.6 g (0.13 mole) of dicyclohexylcarbodiimide to 50 g of dichrolomethane were delivered by drops into the reaction vessel and stirred for 1 hour. Next, a solution prepared by adding 10.9 g (0.089 mol) of 4,4-dimethylaminopyridine to 50 g of dichrolomethane were delivered by drops into the reaction vessel and stirred for 1 hour. After that, a solution prepared by adding 277.0 g (0.063 mol) of methoxypolyethylene glycol (molar number of addition of ethylene oxide was 100) to 250.0 g of dichrolomethane was delivered by drops into the reaction vessel and the reaction was carried out at room temperature for 24 hour. After 24 hours, dichrolomethane was removed in reduced pressure and 310.0 g of white powders were prepared. Prepared crude product was washed 5 times by 500 mL of diethyl ether and dried by pressure reduction to obtain 290 g of one end terminated methoxy PEG 100 azo reaction initiator.

This one end terminated methoxy PEG 100 azo reaction initiator is a polymeric azo reaction initiator of the above formula (17) wherein $R^{16}$ is methyl group; AO is oxyethylene group, and s and t is 100 respectively.

Next, Synthetic Examples 7 to 10, regarding the novel polymers of this invention prepared by using a polymeric azo reaction initiator expressed by the above formula (17), are described.

Synthetic Example 7

A glass reaction vessel equipped with a thermometer, a stirrer, a dropping device, a nitrogen inlet tube and a reflux condenser (cooling tube) was charged with 100.0 g of water, wherein the air inside was replaced with nitrogen under agitation, and then the contents were heated to 95° C. in a nitrogen atmosphere. Subsequently, 70.1 g of methoxypolyethylene glycol methacrylic acid ester (the mean molecular number of added ethylene oxide was 23) and 9.9 g of methacrylic acid were dissolved to 120.0 g of water to prepare monomer mixture solution. Also, 28.0 g of polymeric azo reaction initiator (one end terminated methoxy PEG 100 azo reaction initiator prepared in reference example 1) was dissolved to 72.0 g of water to prepare a reaction initiator solution. Thereafter these monomer mixture solution and reaction initiator solution were delivered by drops at a constant rate over 4.5 hours. After adding monomer mixture solution and reaction initiator solution were finished, the temperature was maintained at 95° C. for 2 hours to complete polymerization reaction. Accordingly, a solution of polymer in this invention (A-7) being weight-average molecular weight of 47,900 was prepared.

The prepared polymer (A-7) in this invention was a mixture containing a polymer (6) wherein a carboxyl group derived from methacrylic acid and polyalkylene glycol chain (2) derived from methoxypolyethylene glycol methacrylic acid ester (the mean molecular number of added ethylene oxide was 23) were connected at one end of polyalkylene glycol chain (1) (the mean molecular number of added ethylene oxide was 100), and polymer (8) containing polyalkylene glycol chain (1) (the mean molecular number of added ethylene oxide was 100) at the end of said polymer (6).

Synthetic Example 8

A glass reaction vessel equipped with a thermometer, a stirrer, a dropping device, a nitrogen inlet tube and a reflux condenser (cooling tube) was charged with 100.0 g of water, wherein the air inside was replaced with nitrogen under agitation, and then the contents were heated to 95° C. in a nitrogen atmosphere. Subsequently, 71.8 g of methoxypolyethylene glycol methacrylic acid ester (the mean molecular number of added ethylene oxide was 23) and 8.2 g of methacrylic acid were dissolved to 120.0 g of water to prepare a monomer mixture solution. Also, 28.0 g of polymeric azo reaction initiator (one end terminated methoxy PEG 100 azo reaction initiator prepared in reference example 1) was dissolved to 72.0 g of water to prepare a reaction initiator solution. Thereafter these monomer mixture solution and reaction initiator solution were delivered by drops at a constant rate over 4.5 hours. After adding a monomer mixture solution and a reaction initiator solution were finished, the temperature was maintained at 95° C. for 2 hours to complete polymerization reaction. Accordingly, a solution of polymer in this invention (A-8) being weight-average molecular weight of 46,800 was prepared.

The prepared polymer (A-8) in this invention was a mixture containing polymer (6) wherein carboxyl group derived from methacrylic acid and polyalkylene glycol chain (2) derived from methoxypolyethylene glycol methacrylic acid ester (the mean molecular number of added ethylene oxide was 23) were connected at one end of polyalkylene glycol chain (1) (the mean molecular number of added ethylene oxide was 100), and polymer (8) containing polyalkylene glycol chain (1) (the mean molecular number of added ethylene oxide was 100) at the end of said polymer (6).

Synthetic Example 9

A glass reaction vessel equipped with a thermometer, stirrer, dropping device, nitrogen inlet tube and reflux condenser (cooling tube) was charged with 100.0 g of water, wherein the air inside was replaced with nitrogen under agitation, and then the contents were heated to 95° C. in a nitrogen atmosphere. Subsequently, 101.1 g of methoxypolyethylene glycol methacrylic acid ester (the mean molecular number of added ethylene oxide was 23) and 19.9 g of methacrylic acid were dissolved to 80.0 g of water to prepare a monomer mixture solution. Also, 42.0 g of polymeric azo reaction initiator (one end terminated methoxy PEG 100 azo reaction initiator prepared in reference example 1) was dissolved to 58.0 g of water to prepare a reaction initiator solution. Thereafter these monomer mixture solution and reaction initiator solution were delivered by drops at a constant rate over 4.5 hours. After adding monomer mixture solution and reaction initiator solution were finished, the temperature was maintained at 95° C. for 2 hours to complete polymerization reaction. Accordingly, a solution of polymer in this invention (A-9) being weight-average molecular weight of 62,900 was prepared.

The prepared polymer (A-9) in this invention was a mixture containing polymer (6) wherein carboxyl group derived from methacrylic acid and polyalkylene glycol chain (2) derived from methoxypolyethylene glycol methacrylic acid ester (the mean molecular number of added ethylene oxide was 23) were connected at one end of polyalkylene glycol chain (1) (the mean molecular number of added ethylene oxide was 100), and polymer (8) containing polyalkylene glycol chain (1) (the mean molecular number of added ethylene oxide was 100) at the end of said polymer (6).

Synthetic Example 10

A glass reaction vessel equipped with a thermometer, a stirrer, a dropping device, a nitrogen inlet tube and a reflux condenser (cooling tube) was charged with 100.0 g of tetrahydrofuran, wherein the air inside was replaced with nitrogen under agitation, and then the contents were heated to 75° C. in a nitrogen atmosphere. Subsequently, 11.9 g of methacrylic acid and 9.2 g of 30% sodium hydroxide solution were dissolved to 38.1 g of water to prepare a monomer mixture solution. Also, 85.0 g of polymeric azo reaction initiator (one end terminated methoxy PEG 100 azo reaction initiator prepared in reference example 1) was dissolved to 198.0 g of water to prepare a reaction initiator solution. Thereafter these monomer mixture solution and reaction initiation solution were delivered by drops at a constant rate over 4.5 hours. After adding monomer mixture solution and reaction initiation solution were finished, the temperature was maintained at 75° C. for 2 hours to complete polymerization reaction. Accordingly, a solution of polymer in this invention (A-10) being weight-average molecular weight of 14,000 was prepared.

The prepared polymer (A-10) in this invention was a mixture containing polymer (5) wherein carboxyl group derived from methacrylic acid was connected at one end of polyalkylene glycol chain (1) (the mean molecular number of added ethylene oxide was 100) and polymer (7) wherein polyalkylene glycol chain (1) (the mean molecular number of added ethylene oxide was 100) was connected at one end of the polymer (5).

Next, comparative synthetic examples 1 and 2 of comparative products prepared by, not using the above polymeric azo reaction initiator nor a polymeric chain transfer agent, but using a low molecular weight reaction initiator and a chain transfer agent, are described.

Comparative Synthetic Example 1

A glass reaction vessel equipped with a thermometer, a stirrer, dropping device, a nitrogen inlet tube and a reflux condenser (cooling tube) was charged with 158.6 of water, wherein the air inside was replaced with nitrogen under agitation, and then the contents were heated to 80° C. in a nitrogen atmosphere. Subsequently, 133.4 g of methoxypolyethylene glycol methacrylic acid ester (the mean molecular number of added ethylene oxide was 23), 26.6 g of methacrylic acid, 40.0 g of water and as chain transfer substance 1.36 g of 3-mercaptopropyone acid (3.0 mol % to monomer) were mixed to prepare a monomer mixture solution. Also, 1.8 g of ammonium persulfate was dissolved to 38.2 g of water to prepare a reaction initiator solution. Thereafter these monomer mixture solutions were delivered by drops over 4 hours, as well as, the reaction initiator solutions were delivered by drops at a constant rate over 5 hours. After adding reaction initiator solution was finished, the temperature was maintained at 80° C. for 1 hour to complete polymerization reaction. Accordingly, a solution of comparative polymer (A-1) being weight-average molecular weight of 24,000 was prepared after cooling to 30° C. and adjusting to pH7.

The prepared comparative polymer (A-1) was a polymer containing carboxyl group derived from methacrylic acid and polyalkylene glycol chain (2) derived from methoxypolyethylene glycol methacrylic acid ester (the mean molecular number of added ethylene oxide was 23), but polyalkylene glycol chain (1) was not contained.

Comparative Synthetic Example 2

A glass reaction vessel equipped with a thermometer, stirrer, dropping device, nitrogen inlet tube and reflux condenser (cooling tube) was charged with 159.0 of water, wherein the air inside was replaced with nitrogen under agitation, and then the contents were heated to 80° C. in a nitrogen atmosphere. Subsequently, 143.7 g of methoxypolyethylene glycol methacrylic acid ester (the mean molecular number of added ethylene oxide was 23), 16.3 g of methacrylic acid, 40.0 g of water and as chain transfer agent 1.02 g of 3-mercaptopropyone acid (3.0 mol % to monomer) were mixed to prepare a monomer mixture solution. Also, 1.8 g of ammonium persulfate was dissolved to 38.2 g of water to prepare a reaction initiator solution. Thereafter these monomer mixture solutions were delivered by drops over 4 hours and the reaction initiator solutions were delivered by drops at a constant rate over 5 hours. After adding the reaction initiator solution was finished, the temperature was maintained at 80° C. for 1 hour to complete polymerization reaction. Accordingly, solution of comparative polymer (A-2) being weight-average molecular weight of 22,000 was prepared after cooling to 30° C. and adjusting to pH7 using 30% NaOH solution.

The prepared comparative polymer (A-2) was a polymer containing carboxyl group derived from methacrylic acid and polyalkylene glycol chain (2) derived from methoxypolyethylene glycol methacrylic acid ester (the mean molecular number of added ethylene oxide was 23), but polyalkylene glycol chain (1) was not contained.

Next, evaluation method of dispersibility of polymers (A-1) to (A-10) prepared in Synthetic Examples 1 to 10 and comparative polymers (A-1) to (A-2) prepared in comparative examples 1 to 2 as described below.

<Evaluation Method of Dispersibility: Mortar Test>

Mortar test was carried out under the condition of temperature of 20° C.±1° C. and relative moisture of 60%±10%.

First, 550 g of Taiheiyo normal Portland cement, 220 g of solution containing a polymer of this invention or a comparative polymer described in Table 1 and an antifoaming agent (NMB Inc. "MA404") and water were charged to hobert type mortar mixer (N-50; Hobert Inc.), and mixed at one-speed for 30 seconds. During the mixing procedure of 30 seconds, 1,350 g of standard sand for cement strength testing (5.1.3 of JIS R5201-1997 annex 2) was charged. After the sand charge, mixing at two-speed for 30 seconds, then the mixing stopped, 15 seconds of scratching and dropping, and 75 seconds of standstill were carried out. After the 75 seconds of standstill, further 60 seconds of mixing at two-speed was carried out and mortar was prepared. A half of the prepared mortar was immediately filled into a flow corn (JIS R5201-1997) on a flow table (JIS R5201-1997); then the filled mortar was hit 15 times with a stick for hitting; and the remained mortar was filled up to the top end of the flow corn; then the filled mortar was hit another 15 times with the stick for hitting; finally the flow corn was fully filled with the remained mortar; and after that, the top surface of the filled mortar in the flow corn was flattened. Subsequently, the flow corn was lifted perpendicularly, and the lengths at two points (respectively, the longest diameter of the spread mortar and the diameter of at angle of 90 degree against said longest diameter) were measured, and the average of said two points was referred to as 0 hit flow value. After measuring of 0 hit flow value, immediately 15 times of falling hits were charged to the flow corn in 15 seconds, and the lengths of two points (the longest diameter of the spread mortar and the diameter of at angle of 90 degree against said longest diameter) were measured, and the average of said two points was referred to as 15 hit flow value. The longer either 0 hit flow value or 15 hit flow value is, the more superior the dispersibility thereof is. The result is shown in Table 1.

As is obvious from Table 1, any mortar, using a polymer of this invention is, regardless of the smaller blending quantity of the polymer compared with the publicly known polymers by using the comparative polymers as copolymers used for cement admixtures, can indicate the same or more 0 hit flow value and 15 hit flow value. In another word, in the case of mortars using comparative polymers, a larger blending quantity of a polymer would be required for indicating the same 0 hit flow value and 15 hit flow value as in the case of using a polymer of this invention. Therefore, it is suggested that a polymer of this invention has more enhanced dispersibility than that of the comparative polymers.

Reference Example 2

In this reference example, a polymeric chain transfer agent of thiol polymer expressed by the above Formula (11), being used in the following synthetic examples 11 or 12 was prepared.

984.91 g of polyethylene glycol (PEG, Aldrich Inc. 373001, GPC value of Mw=4354, Mn=4180), 250.09 g of 3-mercaptopropyonic acid (MPA), 24.70 g of p-toluenesulfonic acid monohydrate and 40.30 g of cyclohexane were charged into a glass reaction vessel equipped with receiver with Dimroth, impeller made of Teflon (registered trademark), mixer with stirring seal, glass-filled thermosensor. After filling the receiver with cyclohexane, the reaction vessel was stirred and heated until the reflux was occurred. Heating was continued for 11 hours with adding cyclohexane to keep the temperature of the reactor at 110±5° C. The result of liquid chromatograph analysis this time was 99.9% of esterification rate of PEG, and 98.1% of concentration of diester in the total esters.

After the reaction was completed, the reaction vessel was cooled to room temperature. After smashing the cured reaction product, adding 1.5 times volume of diethylether and stirring for 30 minutes, powder product was prepared by suction filtration. Further the powder product was washed

TABLE 1

| | weight-average molecular weight | blending quantity of polymer (mass %[1]) | blending quantity of antifoaming agent (mass %[2]) | 0 hit flow value (mm) | 15 hit flow value (mm) |
|---|---|---|---|---|---|
| Polymer in this invention (A-1) | 52300 | 0.09 | 10 | 166 | 229 |
| Polymer in this invention (A-2) | 51500 | 0.10 | 10 | 160 | 220 |
| Polymer in this invention (A-3) | 43300 | 0.10 | 10 | 176 | 239 |
| Polymer in this invention (A-4) | 43000 | 0.11 | 10 | 158 | 217 |
| Polymer in this invention (A-5) | 91600 | 0.07 | 10 | 181 | 240 |
| Polymer in this invention (A-6) | 85600 | 0.09 | 10 | 162 | 225 |
| Polymer in this invention (A-7) | 47900 | 0.09 | 10 | 163 | 231 |
| Polymer in this invention (A-8) | 46800 | 0.10 | 10 | 165 | 228 |
| Polymer in this invention (A-9) | 62900 | 0.11 | 10 | 167 | 230 |
| Polymer in this invention (A-10) | 14000 | 0.11 | 10 | 168 | 231 |
| Comparative polymer (A-1) | 24000 | 0.12 | 10 | 164 | 223 |
| Comparative polymer (A-2) | 22000 | 0.18 | 10 | 165 | 221 |

[1] % by weight against cement usage
[2] % by weight against addition of polymer more than twice through the same procedure. After the wash, the prepared powder product was dried under the condition of $1.33 \times 10^4$ Pa (100 Torr) for more than 24 hours, then the objective product of PEG ester was obtained. The result of the liquid chromatograph analysis this time was 99.5% of esterification rate of PEG, and 76.6% of concentration of diester in the total esters.

This PEG ester was a chain transfer agent of thiol polymer, wherein $R^{14}$ and $R^{15}$ were ethylene groups; AO was oxyethylene group and $q=100$ in the above Formula (11).

<Analytical Conditions for PEG Ester>

PEG ester prepared in the above reference example 2 was analyzed by using liquid chromatography in the following conditions.
Equipment: Waters Alliance (2695)
Analysis software: Empower Professional+GPC option (manufactured by Waters Corporation)
Column: GL Science Inertsil ODS-2 Guard column+Column (internal diameter of 4.6 mm×250 mm×3)
Detector: Differential Refractive Index (RI) Detector (Waters 2414), and Photodiode Detector Array (PDA) Detector (Waters 2996)
Eluting solvent: Solution mixture of acetonitril/100 mM of Acetate in deionized water=40/60 mass %, the pH adjusted to 4.0 using 30% NaOH solution
Flow rate: 0.6 mL/min
Column temperature: 40° C.
Analyzing time: 90 minutes
Apply volume of sample: 100 μL (1% of sample dissolved in the eluting solvent solution)

Synthetic Example 11

In this synthetic example, a methacrylester polymer was prepared by using a polymeric chain transfer agent having thiol group at both ends of polyethylene glycol chain.

First, as a monomer mixture solution, methacrylic acid (MAA), M-230G (Shin-Nakamura Chemical Inc., methoxypolyethylene glycol methacrylate, mean molecular number of added ethyleneoxide is 23), PEG ester prepared in reference example 2, NaOH solution, wherein the amount were described in Table 2, were prepared. Also, as a reaction initiator solution, a solution containing V-50 (2,2'-azobis(2-methylpropyoneamidine)dihydrochloric acid salt, Wako Pure Chemical Industries, Ltd.) was prepared.

A certain volume of water described in Table 2 was charged into glass vessel equipped with Dimroth, an impeller made of Teflon (registered trademark), a mixer with stirring seal, a nitrogen introducing tube and a thermo sensor, stirred at 250 rpm, nitrogen introduced at 100 to 200 mL/min, kept at 80° C. Subsequently, a monomer mixture solution was delivered by drops for 4 hours and a reaction initiator solution was delivered by drops for at a constant rate 5 hours. Further, after the reaction initiator solution adding was finished, polymerization was completed by keeping the temperature at 80° C. for 1 hour. Subsequently, after cooling at room temperature, neutralization was carried out by using 30% NaOH solution as occasion demands. Finally, solutions of the polymers of this invention (B-1) to (B-23) having mean molecular weight by weight in Table 2 were prepared.

The prepared polymers of this invention (B-1) to (B-23) were polymer mixtures containing polymer (2) wherein carboxyl group derived from methacrylic acid and polyalkylene glycol chain (2) derived from methoxypolyethylene glycol methacrylic acid ester (the mean molecular number of added ethylene oxide was 23) were connected at both ends of polyalkylene glycol chain (1) (the mean molecular number of added ethylene oxide was 100), polymer (4) made from repeats of said polymer (2), polymer (6) wherein polyalkylene glycol chain (1) (the mean molecular number of added ethylene oxide was 100) and polyalkylene glycol chain (2) derived from methoxypolyethylene glycol methacrylic acid ester (the mean molecular number of added ethylene oxide was 23) were connected at one end of the polymer (1), and a polymer wherein carboxyl group derived from methacrylic acid and polyalkylene glycol chain (2) derived from methoxypolyethylene glycol methacrylic acid ester (the mean molecular number of added ethylene oxide was 23).

TABLE 2

| | Monomer mixture solution | | | | | Reaction initiator solution | | Reaction vessel | GPC value | | |
|---|---|---|---|---|---|---|---|---|---|---|---|
| | MAA | M-230G | PEG ester | 30% NaOHaq. | Water | V-50 | Water | Water | Mw | Mp | Mn |
| | (g) | (g) | (g) | (g) | (g) | (g) | (g) | (g) | | | |
| Polymer (B-1) | 7.49 | 53.26 | 1.57 | 1.16 | 36.53 | 0.073 | 49.93 | 100.00 | 79,400 | 88,700 | 42,000 |
| Polymer (B-2) | 7.30 | 51.95 | 3.06 | 1.13 | 36.56 | 0.071 | 49.93 | 100.00 | 50,500 | 56,500 | 28,400 |
| Polymer (B-3) | 7.13 | 50.71 | 4.48 | 1.10 | 36.58 | 0.070 | 49.93 | 100.00 | 38,800 | 40,500 | 23,100 |
| Polymer (B-4) | 6.96 | 49.53 | 5.83 | 1.08 | 36.60 | 0.068 | 49.93 | 100.00 | 32,200 | 32,000 | 20,200 |
| Polymer (B-5) | 6.80 | 48.40 | 7.12 | 1.05 | 36.62 | 0.066 | 49.93 | 100.00 | 26,800 | 25,300 | 17,700 |
| Polymer (B-6) | 6.65 | 47.33 | 8.35 | 1.03 | 36.64 | 0.065 | 49.94 | 100.00 | 24,500 | 22,600 | 16,500 |
| Polymer (B-7) | 6.51 | 46.30 | 9.53 | 1.01 | 36.66 | 0.064 | 49.94 | 100.00 | 22,000 | 19,400 | 15,400 |
| Polymer (B-8) | 6.37 | 45.31 | 10.66 | 0.99 | 36.68 | 0.062 | 49.94 | 100.00 | 20,500 | 17,700 | 14,500 |
| Polymer (B-9) | 6.11 | 43.46 | 12.78 | 0.95 | 36.71 | 0.060 | 49.94 | 100.00 | 17,700 | 14,800 | 13,100 |
| Polymer (B-10) | 8.56 | 50.65 | 3.07 | 1.33 | 36.39 | 0.079 | 49.92 | 100.00 | 50,900 | 57,000 | 28,400 |

TABLE 2-continued

|  | Monomer mixture solution | | | | | Reaction initiator solution | | Reaction vessel | GPC value | | |
|---|---|---|---|---|---|---|---|---|---|---|---|
|  | MAA | M-230G | PEG ester | 30% NaOHaq. | Water | V-50 | Water | Water | Mw | Mp | Mn |
|  | (g) | (g) | (g) | (g) | (g) | (g) | (g) | (g) | | | |
| Polymer (B-11) | 8.35 | 49.44 | 4.49 | 1.29 | 36.42 | 0.077 | 49.92 | 100.00 | 37,900 | 39,900 | 22,700 |
| Polymer (B-12) | 7.79 | 46.12 | 8.39 | 1.21 | 36.49 | 0.072 | 49.93 | 100.00 | 24,700 | 22,700 | 16,600 |
| Polymer (B-13) | 7.62 | 45.11 | 9.57 | 1.18 | 36.51 | 0.070 | 49.93 | 100.00 | 22,200 | 19,500 | 15,500 |
| Polymer (B-14) | 7.46 | 44.15 | 10.70 | 1.16 | 36.54 | 0.069 | 49.93 | 100.00 | 20,300 | 17,500 | 14,500 |
| Polymer (B-15) | 10.07 | 50.59 | 1.58 | 1.56 | 36.20 | 0.088 | 49.91 | 100.00 | 81,200 | 91,300 | 42,000 |
| Polymer (B-16) | 9.59 | 48.15 | 4.51 | 1.49 | 36.26 | 0.084 | 49.92 | 100.00 | 40,000 | 41,500 | 23,300 |
| Polymer (B-17) | 9.36 | 47.02 | 5.88 | 1.45 | 36.29 | 0.082 | 49.92 | 100.00 | 31,800 | 31,800 | 19,700 |
| Polymer (B-18) | 9.15 | 45.94 | 7.18 | 1.42 | 36.32 | 0.080 | 49.92 | 100.00 | 27,700 | 26,400 | 17,900 |
| Polymer (B-19) | 8.75 | 43.92 | 9.61 | 1.36 | 36.37 | 0.077 | 49.92 | 100.00 | 22,100 | 19,400 | 15,300 |
| Polymer (B-20) | 8.56 | 42.98 | 10.74 | 1.33 | 36.39 | 0.075 | 49.93 | 100.00 | 20,300 | 17,400 | 14,500 |
| Polymer (B-21) | 8.08 | 34.95 | 6.76 | 1.25 | 28.96 | 0.068 | 39.93 | 80.00 | 24,000 | 21,400 | 16,000 |
| Polymer (B-22) | 9.46 | 40.92 | 11.88 | 1.47 | 36.28 | 0.080 | 49.92 | 100.00 | 19,000 | 15,700 | 13,800 |
| Polymer (B-23) | 8.82 | 33.21 | 7.75 | 1.37 | 28.86 | 0.072 | 39.93 | 80.00 | 21,800 | 18,700 | 15,000 |

Comparative Example 3

In this comparative example, a comparative methacrylester polymer was prepared by not using a polymeric chain transfer agent, but using a low molecular weight polymerization reaction initiator.

First, as a monomer mixture solution, solution containing methacrylic acid (MAA), PGM-25E (methoxypolyethylene glycol methacrylate ester, mean molecular number of added ethyleneoxide is 25), 3-mercaptopropionic acid (MPA) was prepared. Also, as a reaction initiator solution, solution containing ammonium persulfate (APS) as described in Table 3 was prepared.

A certain volume of water described in Table 3 was charged into a glass vessel equipped with Dimroth, an impeller made of Teflon (registered trademark), a mixer with stirring seal, a nitrogen introducing tube and a thermosensor, stirred at 250 rpm, nitrogen introduced at 100 to 200 mL/min, kept at 80° C. Subsequently, a monomer mixture solution was delivered by drops for 4 hours and reaction initiation solution was delivered by drops at a constant rate for 5 hours. Further, after the reaction initiator solution adding was finished, polymerization was completed by keeping the temperature at 80° C. for 1 hour. Subsequently, after cooling at room temperature, neutralization was carried out by using 30% NaOH solution as occasion demands. Finally, solutions of comparative polymers (B-1) to (B-3) having mean molecular weight by weight in Table 3 was prepared.

The prepared comparative polymers (B-1) to (B-3) were polymers containing carboxyl group derived from methacrylic acid and polyalkylene glycol chain (2) derived from methoxypolyethylene glycol methacrylic acid ester (the mean molecular number of added ethylene oxide was 25), but polyalkylene glycol chain (1) was not contained.

TABLE 3

|  | Monomer mixture solution | | | | Reaction initiator solution | | Reaction vessel | GPC value | | |
|---|---|---|---|---|---|---|---|---|---|---|
|  | MAA | PGM-25E | MPA | Water | APS | Water | Water | Mw | Np | Mn |
|  | (g) | (g) | (g) | (g) | (g) | (g) | (g) | | | |
| Comparative polymer (B-1) | 89.68 | 450.32 | 4.89 | 135.00 | 6.21 | 98.79 | 420.00 | 24,200 | 18,600 | 12,600 |
| Comparative polymer (B-2) | 55.17 | 484.83 | 4.88 | 135.00 | 6.21 | 98.79 | 420.00 | 21,700 | 14,800 | 12,100 |
| Comparative polymer (B-3) | 41.67 | 498.33 | 3.20 | 135.00 | 6.21 | 98.79 | 420.00 | 37,500 | 33,200 | 18,300 |

Synthetic Example 12

In this synthetic example, an unsaturated ether polymer was prepared by using a polymeric chain transfer agent having thiol group at both ends of polyethylene glycol chain.

First, as monomer mixture solution, a certain volume of acrylic acid (AA) solution described in Table 4 was prepared. Also, a certain volume of PEG ester prepared in reference example 2 was prepared as described in Table 4. Further, as a reaction initiator solution, a certain volume of solution containing V-50 (2,2'-azobis (2-methylpropyoneamidine) dihydrochloric acid salt, manufactured by Wako Pure Chemical Industries, Ltd., was prepared as described in Table 4.

IPN-50 (substance, 50 mol of ethyleneoxide to 3-methyl-3-butene-1-ol added), AA and water were charged as described in Table 4 into a glass vessel equipped with Dimroth, an impeller made of Teflon (registered trademark), a mixer with stirring seal, a nitrogen introducing tube and a thermosensor, stirred at 250 rpm, nitrogen introduced at 100 to 200 mL/min, kept at 70° C. Subsequently, a monomer mixture solution was delivered by drops for 3 hours, a polymeric chain transfer agent solution was delivered by drops for 3.5 hours and a reaction initiator solution was delivered by drops for 3.5 hours at a constant rate. Further, after the reaction initiator solution adding was finished, polymerization was completed by keeping the temperature at 70° C. for 1 hour. Subsequently, after cooling at room temperature, neutralization was carried out by using 30% NaOH solution as occasion demands. Finally, a solution of polymers in this invention (C-1) to (C-3) having mean molecular weight by weight in Table 4 was prepared.

The prepared polymers in this invention (C-1) to (C-3) were mixtures containing polymer (2) wherein carboxyl group derived from acrylic acid and polyalkylene glycol chain (2) derived from IPN-50 (the mean molecular number of added ethylene oxide was 50) were connected at both ends of polyalkylene glycol chain (1) (the mean molecular number of added ethylene oxide was 100), polymer (4) made from repeats of the polymer (2), polymer (6) wherein carboxyl group derived from acrylic acid and polyalkylene glycol chain (2) derived from IPN-50 (the mean molecular number of added ethylene oxide was 50) were connected at one end of the polymer (1) (the mean molecular number of added ethylene oxide was 100), and a polymer wherein carboxyl group derived from acrylic acid and polyalkylene glycol chain (2) derived from IPN-50 (the mean molecular number of added ethylene oxide was 50).

Next, an evaluation method of dispersibility of typical polymers and comparative polymers among polymers (B-1) to (B-23) prepared in the above synthetic example 13, comparative polymers (B-1) to (B-3) prepared in the above comparative example 3, and polymers (C-1) to (C-3) prepared in the above synthetic example 14 is described below.

<Evaluation Method of Dispersing Ability: Mortar Test>

A mortar test was carried out under the condition of temperature of 20° C.±1° C., relative moisture of 60%±10%.

First, 550 g of Taiheiyo normal Portland cement, 220 g of solution containing polymer of this invention or comparative polymer described in Table 5 or 6, an antifoaming agent (NMB Inc. "MA404") and water were charged to hobert type mortar mixer (N-50; Hobert Inc.), and mixed at one-speed for 30 seconds. During the mixing procedure of 30 seconds, 1,350 g of standard sand for cement strength testing (5.1.3 of JIS R5201-1997 annex 2) was charged. After the sand charge, mixing at two-speed for 30 seconds, then the mixing stopped, 15 seconds of scratching and dropping and 75 seconds of standstill were carried out. After the 75 seconds of standstill, further 60 seconds of mixing at two-speed was carried out and then the mortar was prepared. A half of the prepared mortar was immediately filled into a flow corn (JIS R5201-1997) on a flow table (JIS R5201-1997); then the filled mortar was hit 15 times with a stick for hitting; and the remained mortar was filled up to the top end of the flow corn; then the filled mortar was hit another 15 times with the stick for hitting; finally the flow corn was fully filled with the remained mortar; and after that, the top surface of the filled mortar in the flow corn was flattened. Subsequently, the flow corn was lifted perpendicularly, and the lengths at two points (respectively, the longest diameter of the spread mortar and the diameter of at angle of 90 degree against said longest diameter) were measured, and the average of said two points was referred to as 0 hit flow value. After measuring of 0 hit flow value, immediately 15 times of falling hits were charged to the flow corn in 15 seconds, and the lengths of two points (the longest diameter of the spread mortar and the diameter of at angle of 90 degree against said longest diameter) were measured, and the average of said two points was referred to as 15 hit flow value. The longer either 0 hit flow value or 15 hit flow value is, the more superior the dispersibility thereof is. The result is shown in Table 5 and 6.

In the above mortar test, for confirming uniformity of the state of each mortar, the volumes of air and temperatures of the mortars were measured. The volumes of the mortars were measured as follows. First, about 200 mL of mortar was injected to 500 mL of measuring cylinder and after hitting with stick of 8 mm diameter, crude air bubble was removed by vibrating the measuring cylinder. Also, about 200 mL of

TABLE 4

| | Monomer mixture solution | | Chain transfer agent solution | | Reaction initiator solution | | Reaction vessel | | | GPC value | | |
|---|---|---|---|---|---|---|---|---|---|---|---|---|
| | AA (g) | Water (g) | PEG ester (g) | Water (g) | V-50 (g) | Water (g) | IPN-50 (g) | AA (g) | Water (g) | Mw | Mp | Mn |
| Polymer (C-1) | 4.15 | 29.08 | 1.86 | 60.39 | 0.05 | 49.95 | 68.86 | 0.12 | 35.54 | 45,800 | 49,600 | 29,100 |
| Polymer (C-2) | 4.05 | 28.37 | 3.63 | 61.95 | 0.05 | 49.95 | 67.19 | 0.12 | 34.68 | 33,800 | 34,200 | 23,000 |
| Polymer (C-3) | 3.87 | 27.06 | 6.93 | 64.86 | 0.05 | 49.96 | 64.09 | 0.12 | 33.08 | 23,600 | 22,900 | 17,500 | mortar was added and air bubble was removed likewise, thereafter the mass was measured, then the volume of air in the mortar was to be calculated from the measured mass and density of each material. The results are shown in Table 5 and 6.

TABLE 5

| | blending quantity of polymer (mass %[1]) | 0 hit flow value (mm) | 15 hit flow value (mm) | Volume of air in the mortar (% by volume) | Temperature of the mortar (° C.) |
|---|---|---|---|---|---|
| Polymer (B-1) | 0.08 | 159 | 217 | 3.6 | 23.4 |
| Polymer (B-3) | 0.08 | 153 | 220 | 3.3 | 23.1 |
| Polymer (B-5) | 0.08 | 137 | 202 | 3.2 | 23.4 |
| Polymer (B-10) | 0.08 | 153 | 219 | 3.6 | 23.5 |
| Polymer (B-11) | 0.08 | 158 | 226 | 3.5 | 23.2 |
| Polymer (B-14) | 0.08 | 130 | 197 | 3.4 | 23.0 |
| Polymer (B-16) | 0.08 | 140 | 204 | 3.4 | 23.0 |
| Polymer (B-18) | 0.08 | 141 | 205 | 3.4 | 22.8 |
| Polymer (B-20) | 0.08 | 139 | 204 | 3.7 | 23.5 |
| Comparative polymer (B-1) | 0.10 | 190 | 244 | 3.2 | 23.6 |
| Comparative polymer (B-1) | 0.09 | 154 | 218 | 3.7 | 22.8 |
| Comparative polymer (B-1) | 0.08 | 125 | 189 | 3.7 | 23.4 |
| Comparative polymer (B-2) | 0.08 | 115 | 181 | 4.2 | 23.3 |
| Comparative polymer (B-3) | 0.08 | 103 | 154 | 3.6 | 23.4 |

[1]mass % against cement blending quantity

As is obvious from Table 5, in the case of using polymers in this invention of 0.08 mass % addition, larger 0 hit flow value or 15 hit flow value of the mortars compared with the mortars using comparable polymers of the publicly known copolymers for cement admixtures were indicated under an equivalent condition of air volume contained in the mortar and temperature. In another word, in the case of the mortar using comparative polymers, a larger blending quantity, for instance 0.09 or 0.10 mass %, of polymer adding would be required for indicating the equivalent 0 hit flow value and 15 hit flow value than that in the case of using a polymer in this invention. Therefore, it is clear that a polymer of this invention has superior dispersibility than that of comparative polymers.

TABLE 6

| | blending quantity of polymer (mass %[1]) | 0 hit flow value (mm) | 15 hit flow value (mm) | Volume of air in the mortar (% by volume) | Temperature of the mortar (° C.) |
|---|---|---|---|---|---|
| Polymer (C-3) | 0.09 | 125 | 191 | 3.1 | 22.2 |
| Polymer (C-2) | 0.09 | 141 | 208 | 3.3 | 22.1 |
| Polymer (C-1) | 0.09 | 143 | 209 | 3.5 | 22.5 |

[1]mass % against cement blending quantity

As is obvious from Table 6, in the case of using a polymer of this invention, comparatively good 0 hit flow value or 15 hit flow value of each mortar was indicated when the blending quantity of the polymer was 0.09 mass % under an equivalent condition of air volume contained in the mortar and temperature. Therefore, it is clear that a polymer of this invention can exhibit superior dispersibility

INDUSTRIAL APPLICABILITY

The novel polymer of this invention can exhibit superior dispersibility to conventionally used copolymers used for cement admixtures, obtained by copolymerization of an unsaturated carboxylic acid monomer and an unsaturated polyalkylene glycol monomer, so it is suitable for production of cement admixtures. The cement admixture of this invention can be used with a small blending quantity thereof for preparation of cement compositions, so excellent characteristics of cement is not damaged. Therefore, either a novel polymer of this invention and cement admixtures using it can make large contribution to the fields of civil engineering and construction or so.

What is claimed is:

1. A polymer,
   comprising a polyalkylene glycol chain and two polymer segments, each including a constituent unit derived from unsaturated monomers, which are respectively bonded to both ends of said polyalkylene glycol chain, wherein the unsaturated monomers constituting each polymer segment include an unsaturated carboxylic acid monomer and an unsaturated polyalkylene glycol monomer.

2. The polymer according to claim 1,
   obtained by polymerization of unsaturated monomers including an unsaturated carboxylic acid monomer and an unsaturated polyalkylene glycol monomer, wherein the polymerization is carried out by using at least one member selected from the group consisting of a polymerization initiator having a polyalkylene glycol chain and a radical generation segment, and a chain transfer agent having a polyalkylene glycol chain.

3. A cement admixture, comprising the polymer according to claim 1 or 2.

4. The polymer according to claim 1, wherein when the unsaturated carboxylic acid monomer is the main component of the unsaturated monomers, the ratio, by mass %, of the amount of the polyalkylene glycol chain to the total amount of the unsaturated carboxylic acid monomer, the unsaturated polyalkylene glycol monomer, and a copolymerizable monomer is from 40/60 to 99/1.

5. The polymer according to claim 1, wherein when the unsaturated polyalkylene glycol monomer is the main component of the unsaturated monomers, the ratio, by mass %, of the amount of the polyalkylene glycol chain to the total amount of the unsaturated carboxylic acid monomer, the unsaturated polyalkylene glycol monomer, and a copolymerizable monomer is from 2/98 to 95/5.

6. The polymer according to claim 1, wherein the amount of the unsaturated carboxylic acid monomer is in a ratio, by mass %, of the amount of the unsaturated carboxylic acid monomer to the total amount of the polyalkylene glycol chain, the unsaturated polyalkylene glycol monomer, and a copolymerizable monomer, ranging from 1 to 50/from 99 to 50.

* * * * *